United States Patent
Hou et al.

(10) Patent No.: US 12,445,230 B2
(45) Date of Patent: Oct. 14, 2025

(54) METHOD AND DEVICE FOR FEEDBACK CHANNEL ENHANCEMENT IN WIRELESS COMMUNICATION

(71) Applicant: Sony Group Corporation, Tokyo (JP)

(72) Inventors: Yanzhao Hou, Beijing (CN); Xiaofeng Tao, Beijing (CN); Chengrui Wang, Beijing (CN); Yang Wen, Beijing (CN); Xiaoxue Wang, Beijing (CN); Min Liu, Beijing (CN); Chen Sun, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 373 days.

(21) Appl. No.: 18/006,738

(22) PCT Filed: Jul. 30, 2021

(86) PCT No.: PCT/CN2021/109451
§ 371 (c)(1),
(2) Date: Jan. 25, 2023

(87) PCT Pub. No.: WO2022/028316
PCT Pub. Date: Feb. 10, 2022

(65) Prior Publication Data
US 2023/0283414 A1    Sep. 7, 2023

(30) Foreign Application Priority Data
Aug. 5, 2020 (CN) .......................... 202010780469.7

(51) Int. Cl.
*H04L 1/1829* (2023.01)
*H04L 1/1607* (2023.01)
*H04L 5/00* (2006.01)

(52) U.S. Cl.
CPC .......... *H04L 1/1861* (2013.01); *H04L 1/1607* (2013.01); *H04L 5/0055* (2013.01)

(58) Field of Classification Search
CPC .... H04L 1/1607; H04L 1/1861; H04L 5/0055
See application file for complete search history.

(56) References Cited

U.S. PATENT DOCUMENTS

2019/0306911 A1* 10/2019 Hahn ................ H04W 72/0453
2021/0400639 A1* 12/2021 Lee ........................ H04W 24/10
(Continued)

FOREIGN PATENT DOCUMENTS

| CN | 106304328 A | 1/2017 |
|---|---|---|
| CN | 108631968 A | 10/2018 |

(Continued)

OTHER PUBLICATIONS

Fraunhofer et al., Resource Allocation for Mode 2 NR V2X, 3GPP TSG RAN WG1 #97, R1-1906651, Reno, USA, May 13-17, 2019 (Year: 2019).*

(Continued)

*Primary Examiner* — Brian P Cox
(74) *Attorney, Agent, or Firm* — XSENSUS LLP

(57) ABSTRACT

The present disclosure relates to method and device for enhancing feedback channel in wireless communication. There is provided a receiving-side electronic device for a receiving side of a communication system, which includes a processing circuit configured to receive initial transmission information from a first electronic device among more than one transmitting-side electronic devices for a transmitting side of the communication system; in case that data information in the initial transmission information cannot be successfully decoded, acquire auxiliary information; and feed back the auxiliary information to the first electronic device, so that the first electronic device can perform the (Continued)

information retransmission by using the resources determined based on the auxiliary information.

3 Claims, 13 Drawing Sheets

(56) References Cited

U.S. PATENT DOCUMENTS

| | | | |
|---|---|---|---|
| 2022/0183028 A1* | 6/2022 | Lee | H04W 28/0975 |
| 2022/0353846 A1* | 11/2022 | Wang | H04W 72/0446 |
| 2022/0394560 A1* | 12/2022 | Yu | H04W 72/0446 |

FOREIGN PATENT DOCUMENTS

| | | |
|---|---|---|
| CN | 110291739 A | 9/2019 |
| CN | 111436151 A | 7/2020 |
| WO | WO-2017099867 A1 | 6/2017 |

OTHER PUBLICATIONS

International Search Report and Written Opinion mailed on Sep. 30, 2021, received for PCT Application PCT/CN2021/109451, filed on Jul. 30, 2021, 10 pages including English Translation.

CATT, "On Mode 2 Resource allocation in NR V2X", 3GPP TSG RAN WG1 Meeting #97, R1-1906316, May 13-17, 2019, 10 pages.

Intel Corporation, "Sidelink Resource Allocation Design for NR V2X Communication", 3GPP TSG RAN WG1 Meeting #96bis, R1-1904296, Apr. 8-12, 2019, pp. 1-15.

Sony, "Discussion on NR V2X mode 2 resource allocation", 3GPP TSG RAN WG1 #96bis, R1-1904256, Apr. 8-12, 2019, 5 pages.

Intel Corporation, "Sidelink Resource Allocation Design for V2X Communication", 3GPP TSG RAN WG1 Meeting #96bis, Apr. 3, 2019, pp. 1-9, R1-1904296.

* cited by examiner

METHOD AND DEVICE FOR FEEDBACK CHANNEL ENHANCEMENT IN WIRELESS COMMUNICATION

CROSS-REFERENCE TO RELATED APPLICATION APPLICATIONS

This application is based on PCT filing PCT/CN2021/109451, filed on Jul. 30, 2021, which claims the priority of China Patent Application No. 202010780469.7, filed on Aug. 5, 2020, the entire content of each is hereby incorporated by reference.

FIELD OF THE INVENTION

The present disclosure relates to wireless communication, in particular to feedback in wireless communication.

BACKGROUND

With the development of wireless communication technology, intelligent transportation has attracted increasing attention and developed rapidly. V2 (Vehicle-to-Everything) technology is the key technology of intelligent transportation system in the future. It enables communication from vehicle to vehicle, communication from vehicle to base station, and communication from base station to base station, and obtains a series of traffic information such as real-time road conditions, road information, pedestrian information, etc., thus improving driving safety, reducing congestion, improving traffic efficiency, and providing on-board entertainment information.

The NR (New Radio Access Technology in 3GPP)-V2X (Vehicle to everything Network) standard formulated by the 3GPP (3rd generation partnership project) supports direct communication between V2V (vehicle to vehicle) and V2I (vehicle-to-roadside unit), and by introducing various communication manners such as multicast and broadcast, etc., and optimizing sensing, scheduling, retransmission, and vehicle-to-vehicle connection quality control, etc., can realize richer V2X application scenarios of V2X supporting vehicle formation, semi-automatic driving, extended sensor, remote driving, etc. With the development of communication technology, and the development of 5G related research and standardization, NR-V2X has become a hot research issue. Especially, the communication resource allocation in NR V2X, especially the resource allocation for information retransmission, deserves to be optimized.

Unless otherwise stated, it should not be assumed that any of the methods described in this section become prior art only because they are included in this section. Similarly, unless otherwise stated, the problems recognized about one or more methods should not be assumed to be recognized in any prior art on the basis of this section.

DISCLOSURE OF THE INVENTION

The present disclosure provides a method for feedback channel enhancement in wireless communication, wherein in the wireless communication, a receiving-side electronic device feeds back additional auxiliary information to a transmitting-side electronic device to help the transmitting-side electronic device to make proper resource selection/configuration during communication transmission, especially retransmission, so as to avoid retransmission failure caused by resource conflict, etc., and ensure high reliability and low delay of retransmission.

In one aspect, there is provided a receiving-side electronic device for a receiving side of a communication system, the receiving-side electronic device being capable of communicating with more than one transmitting-side electronic devices for a transmitting side of the wireless communication system, the receiving-side electronic device comprising a processing circuit configured to: receive initial transmission information from a first electronic device among the more than one transmitting-side electronic devices; in case that data information in the initial transmission information cannot be successfully decoded, acquire auxiliary information, which is able to be used to determine resources used by the first electronic device for information retransmission with the receiving-side electronic device; and feed back the auxiliary information to the first electronic device, so that the first electronic device is able to perform the information retransmission by using the resources determined based on the auxiliary information.

In another aspect, there is provided a method for a receiving side of a wireless communication system, the method comprising: receiving initial transmission information from a first electronic device among the more than one transmitting-side electronic devices for a transmitting side of the wireless communication system; in case that data information in the initial transmission information cannot be successfully decoded, acquiring auxiliary information, which is able to be used to determine resources used by the first electronic device for information retransmission with the receiving-side electronic device; and feeding back the auxiliary information to the first electronic device, so that the first electronic device is able to perform the information retransmission by using the resources determined based on the auxiliary information.

In yet another aspect, there is provided a transmitting-side electronic device for a transmitting side of a wireless communication system, the transmitting-side electronic device being capable of communicating with at least one receiving-side electronic device for a receiving side of the wireless communication system, the transmitting-side electronic device comprising a processing circuit configured to, for each of the at least one receiving-side electronic device, send initial transmission information to the receiving-side electronic device; receive auxiliary information from the receiving-side electronic device, wherein the auxiliary information is able to be used to determine resources used by the transmitting-side electronic device for information retransmission with the receiving-side electronic device; and perform information retransmission by utilizing the resources determined based on the auxiliary information.

In yet another aspect, there is provided a method for a transmitting side of a wireless communication system, the method comprising: for each of at least one receiving-side electronic device for the wireless communication system, sending initial transmission information to the receiving-side electronic device; receiving auxiliary information from the receiving-side electronic device, wherein the auxiliary information is able to be used to determine resources used by the transmitting-side electronic device for information retransmission with the receiving-side electronic device; and performing information retransmission by utilizing the resources determined based on the auxiliary information.

In still another aspect, there is provided a device comprising at least one processor and at least one storage device, the at least one storage device having stored instructions thereon which, when executed by the at least one processor, can cause the at least one processor to implement the method as described herein.

In still another aspect, there is provided a storage medium storing instructions which, when executed by a processor, can cause the method as described herein to be performed.

In still another aspect, there is provided an apparatus comprising means for performing the method as described herein.

Other features of the present disclosure will become apparent from the following description of exemplary embodiments with reference to the accompanying drawings.

DESCRIPTION OF THE DRAWINGS

The drawings, incorporated in the description and constituting a part of the description, illustrate the embodiments of the present invention, and serve to interpret the principle of the present invention along with the description. In the drawings, the like terms will be denoted by the like reference numerals.

Figure 1:
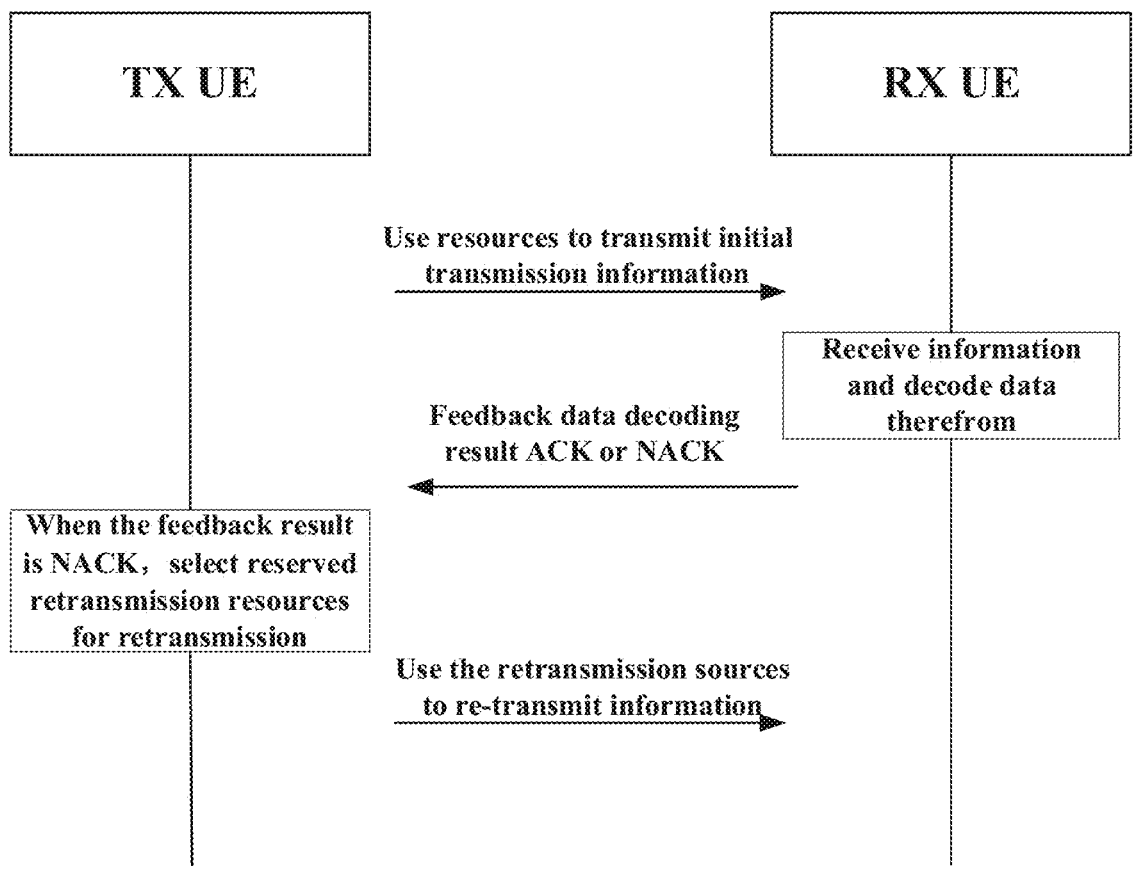
FIG. 1 illustrates a retransmission signaling diagram in NR-V2X in the prior art.

Although the embodiments of the present disclosure are shown by way of example in the drawings and are described in detail herein, it should be understood that the drawings and detailed description thereof are not intended to limit the embodiments to the particular forms disclosed, but on the contrary, the intention is to cover all modifications, equivalents, and alternatives falling within the spirit and scope of the claims. The embodiments of this disclosure may be susceptible to various modifications and alternative forms.

DETAILED DESCRIPTION OF PREFERRED EMBODIMENTS

Hereinafter, exemplary embodiments of the present disclosure will be described with reference to the accompanying drawings. For the sake of clarity and conciseness, not all features of the embodiments are described in the description. However, it should be understood that many implementation-specific settings must be made during the implementation of the embodiments in order to achieve specific goals of developers, for example, to meet those constraints related to equipment and business, and these constraints may vary with different implementations. In addition, it should be understood that although the development work may be very complicated and time-consuming, it is only a routine task for those skilled in the art who benefit from this disclosure.

Here, it should also be noted that in order to avoid obscuring the present disclosure by unnecessary details, only processing steps and/or equipment structures closely related to the schemes at least according to the present disclosure are shown in the drawings, while other details not closely related to the present disclosure are omitted. It should be noted that similar reference numerals and letters indicate similar items in the drawings, and therefore, once an item is defined in one drawing, there is no need to discuss it for subsequent drawings.

In this disclosure, the terms "first", "second" and the like are only used to distinguish elements or steps, and are not intended to indicate time sequence, preference or importance.

In this disclosure, "transmitter side"/"transmitting side" has the full breadth of its usual meaning, and generally indicates a side of a communication system that transmits signal streams, and for example, it may include devices as a part of a wireless communication system or a radio system that configure/select resources and transmit data using the resources. "receiver side"/"receiving side" has the full breadth of its usual meaning, and generally indicates a side of a communication system that receives the signal streams, and for example, it may include devices as a part of a wireless communication system or a radio system that receive the transmitted data and, if necessary, provide feedback. The transmitting-side electronic device can be configured to communicate with the receiving-side electronic device through wireless communication technologies such as 4G, 5G, etc.

According to the embodiment, both the transmitting side and the receiving side can refer to user equipments (UEs) that directly communicate with each other in a wireless communication system. The term "user equipment" or "UE" has the full breadth of its usual meaning, and at least includes terminal equipments used as a part of wireless communication system or radio system for communication, such as vehicle communication equipments in V2X, mobile equipments in cell communication, unmanned aerial vehicles, robots, etc. in similar application scenarios, or their elements. In the following, the present disclosure will be mainly described by taking sidelink communication between user equipments (UEs) in V2X communication scenario as an example, but it should be understood that the present disclosure is equally applicable to UE communication in other communication scenarios, such as user equipments in device-to-device (D2D) scenario. Even the present disclosure is equally applicable to communication between transmitting devices in other communication scenarios, for example, the transmitter and the receiver may also both be the base station, such as in a scenario of wireless communication between a mobile base station and a fixed base station or between mobile base stations in a system including a mobile relay station, the transmitting side and the receiving side both are base stations.

Sidelink is a type of link introduced to support direct communication between V2X devices. When UE communicates with each other via the sidelink, allocated resources can be used for unicast, multicast and broadcast transmission on the sidelink. There are two resource allocation modes in NR V2X: mode 1 and mode 2. Mode 1 corresponds to resource scheduling by the base station, in which the base station serving a plurality of user equipments (UEs) allocates transmission resources to the user equipments (UEs) it serves, so that the UEs on the transmitting side can communicate with the UEs on the receiving side. Mode 2 corresponds to autonomous resource selection by UE. For example, the transmitting-side device or other devices responsible for resource allocation for the transmitting-side device can select and reserve resources through resource sensing. That is to say, the communication resources set by the transmitting-side device for retransmission are selected by itself or other devices responsible for resource allocation for the transmitting-side device through resource sensing, for communication transmission and subsequent retransmission. Referring to FIG. 1, a signaling diagram illustrating sidelink communication between UEs in the resource allocation mode 2 in the prior wireless communication will be described conceptually.

In the sidelink wireless communication, the user equipment on the transmitting side (TX UE for short) can use the allocated communication resources to transmit data to the user equipment on the receiving side (RX UE for short).

RX UE receives the transmitted information, decodes the transmitted data therefrom, and feeds back the reception result to TX UE. For example, the specific form of feedback can be ACK/NACK or NACK-only. For example, after successfully receiving and decoding the data sent by the TX UE, the RX UE may send an acknowledgement message ACK as feedback to the TX UE to inform the successful reception; if the data sent by the TX UE is not successfully decoded, the RX UE may send information NACK as feedback to the TX UE to inform that the reception fails. Particularly, the UEs on the receiving side can only send the feedback information NACK in the case of unsuccessful reception, and not send any feedback information in the case of successful reception.

In case that the TX UE receives NACK feedback from the RX UE, the TX UE retransmits data to the RX UE, in particular, performs HARQ (Hybrid Automatic Repeat Request) retransmission, so that the data is retransmitted to the RX UE through preset/reserved resources. In the current resource allocation mode 2 of sidelink wireless communication, the retransmission operation of TX UE belongs to blind retransmission, that is to say, the resources used for retransmission are reserved/selected in advance, but the resources used by other transmitting-side devices communicating with the receiving-side device are not known, so that resource conflict may occur, resulting in transmission failure.

For example, in the resource allocation mode 2, when TX UE selects/reserves resources through resource sensing, if other TX UEs are far away, the transmission resources selected by TX UE or the device responsible for resource allocation for the TX UE (e.g., a master UE) may be the same as or overlap with the resources used by the far-away UEs. If RX UE is within the communication range of the far-away UEs, then wireless communication transmission, especially retransmission, will lead to a hidden node problem: that is, if the RX UE cannot correctly decode the information sent by the receiving TX UE due to interference, the RX UE will feed back a NACK to the TX UE, and the TX UE will use the reserved resources for retransmission, but the used reserved resources may conflict with the resources used by the far-away TX UEs, such as the same or overlapping, and such communication interference may cause the retransmitted data not to be successfully received by the RX UE. This reduces the reliability of communication between TX UE and RX UE, and increases the time delay of communication.

In view of this, the present disclosure proposes an improved feedback channel enhancement scheme, especially an improved scheme for information retransmission in sidelink wireless communication. Among them, the RX UE provides auxiliary information in feedback that can be used by TX UE to determine transmission resources, especially retransmission resources, so that TX UE can select/configure appropriate resources for subsequent transmission, especially retransmission, based on the auxiliary information, thus effectively avoiding resource conflicts, improving reliability, and reducing communication delay.

Particularly, according to the present disclosure, when the receiving-side device cannot successfully decode the data transmitted by the transmitting-side device, the receiving-side device feeds back auxiliary information to the transmitting-side device, which can use the auxiliary information to judge whether the reserved retransmission resources are appropriate, so that the transmitting-side device can select appropriate resources for retransmission according to the judgment result before retransmission. For example, if it is judged that the reserved retransmission resources will not conflict with the resources used by other transmitting-side devices, the reserved retransmission resources can be used for data retransmission; if it is judged that the reserved retransmission resources will conflict with the resources used by other transmitting-side devices, the resource sensing/allocation is performed again to determine new resources for data retransmission.

It should be pointed out that the basic concept of the present disclosure is mainly directed to a communication situation that the resources used by a transmitting-side electronic device for transmission are selected/allocated when it is unknown the transmission resources of other specific transmitting-side electronic device, in particular, the transmitting-side electronic devices which cannot be sensed by the transmitting electronic device, such as, other transmitting-side electronic devices outside the communication range of the transmitting-side electronic device but within the communication range of the receiving-side electronic device, for example, the transmission resources for the transmitting-side electronic device are determined by the transmitting-side electronic device or other devices responsible for resource allocation for the transmitting-side electronic device without knowing the transmission resources used by other specific transmitting-side electronic devices in the communication system, e.g., determined by resource sensing, or selected from a pre-allocated resource pool which is constructed without knowing the resource allocation of other specific transmitting-side electronic devices. This is especially suitable for the sidelink mode 2 transmission mode in wireless communication, and of course it is also suitable for other communication scenarios, as long as the resource configuration in these communication scenarios is determined/selected relatively independently as described above. Therefore, the transmitting-side electronic device and the receiving-side electronic device of the present disclosure can be applied to devices that can communicate with each other in a sidelink or similar way and follow the resource allocation mode 2, and can be the same type of devices, such as UE, or different types of devices.

Hereinafter, the scheme according to the present disclosure will be described mainly in connection with the sidelink communication transmission scenario in NR-V2X, especially a feedback channel enhancement method in wireless communication based on resource allocation mode 2 in the NR-V2X sidelink communication scenario will be described as an example, in which RX UE feeds back additional auxiliary information to TX UE, to assist the TX UE in resource selection for retransmission, thereby avoiding retransmission failure due to resource conflict and ensuring high reliability and low delay of retransmission. It should be pointed out that V2X is only an example, and the basic concept of the present disclosure can be applied to other similar application scenarios, especially application scenarios of communication transmission based on a resource allocation mode similar to the resource allocation mode 2 through the sidelink, such as application scenarios of device-to-device (D2D) in the Internet of Things (IoTs), vehicle-to-vehicle (V2V), vehicle-to-person (V2P), vehicle-to-roadside unit (V2I) in Internet of Vehicles (IoVs), factory automation cases, point to point communication (P2P), wireless sensor network (WSN), and so on.

Figure 2:
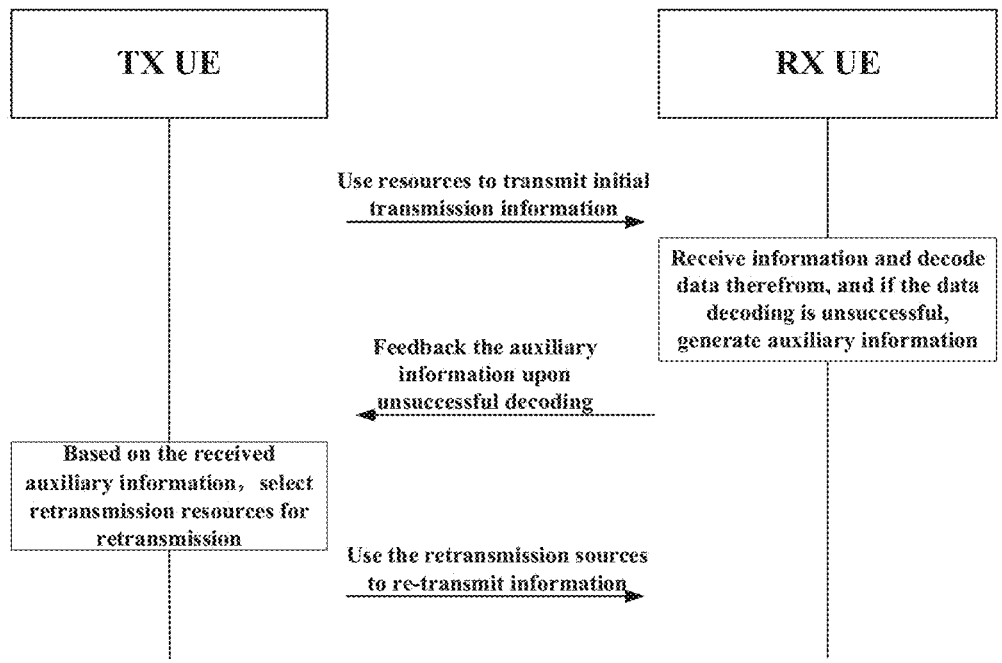
FIG. 2 illustrates a retransmission signaling diagram in NR-V2X according to the present disclosure.

A schematic signaling diagram of a feedback enhancement channel scheme according to an embodiment of the present disclosure will be described below with reference to FIG. 2.

In the sidelink communication between UEs, the TX UE uses the allocated resources to send information, such as initial transmission information, to the RX UE. For example, the information can be transmitted through a physical sidelink control channel (PSCCH) and a physical sidelink shared channel (PSSCH), wherein a part of SCI information can be transmitted through PSCCH, another part of the SCI information and data information can be transmitted through PSSCH, and the SCI information transmitted through the PSCCH contains information about time-frequency resources occupied by the currently transmitted PSSCH, and optionally can further contain information about reserved time-frequency resources for HARQ retransmission. As an example, the initial transmission information can be transmitted in two stages. The first stage is to transmit a part of SCI information containing time-frequency resource information via PSCCH, and the second stage is to transmit the other part of SCI and data information via PSSCH.

The transmission resources of PSSCH can be selected/determined by TX UE itself through resource sensing, or other devices responsible for resource allocation/scheduling, such as other TX UEs, also be called master UEs, can allocate resources for this TX UE. However, it should be pointed out that the resource allocation, selection, determination and so on for TX UE are made without knowing the resource status of other TX UEs which communicate with RX UE and are outside of the sensing range of this TX UE.

Then, RX UE decodes the information sent by TX UE to know the time-frequency resources occupied by PSSCH indicated in SCI, and then decodes the data sent by TX UE on the time-frequency resources. Particularly, as an example, corresponding to the two-stage transmission of initial transmission information, RX UE first receives and decodes SCI information transmitted via PSCCH, and obtains the information about allocated PSSCH time-frequency resources therefrom, so that the location of data information (the location of PSSCH) can be obtained, and then the transmitted data is decoded at this location upon receipt of the information transmitted via PSSCH.

As an example, when UEs communicate with each other through sidelink, the RX UE can provides feedback, for example, that for the data sent by the transmitting-side UE, to the TX UE through physical sidelink feedback channel (PSFCH). If the data is successfully decoded, an ACK may be fed back to the TX UE, or no feedback may be provided. If the data is not successfully decoded, the RX UE may feed back auxiliary information to the TX UE, which may be fed back together with NACK or separately. The auxiliary information can be in any suitable form, as long as it can be used for TX UE resource determination/selection, and the auxiliary information can be fed back in any suitable way, which will be described in detail below.

According to the feedback auxiliary information, TX UE selects appropriate resources for retransmission. If it is determined that the resources reserved for the TX UE are available based on the auxiliary information, the TX UE selects the reserved resources for retransmission. If it is determined that the resources reserved for the TX UE are unavailable based on the auxiliary information, the TX UE will reselect resources for retransmission. Therefore, it can effectively reduce or even avoid resource conflict during information retransmission, improve reliability and reduce time delay.

Figure 3:
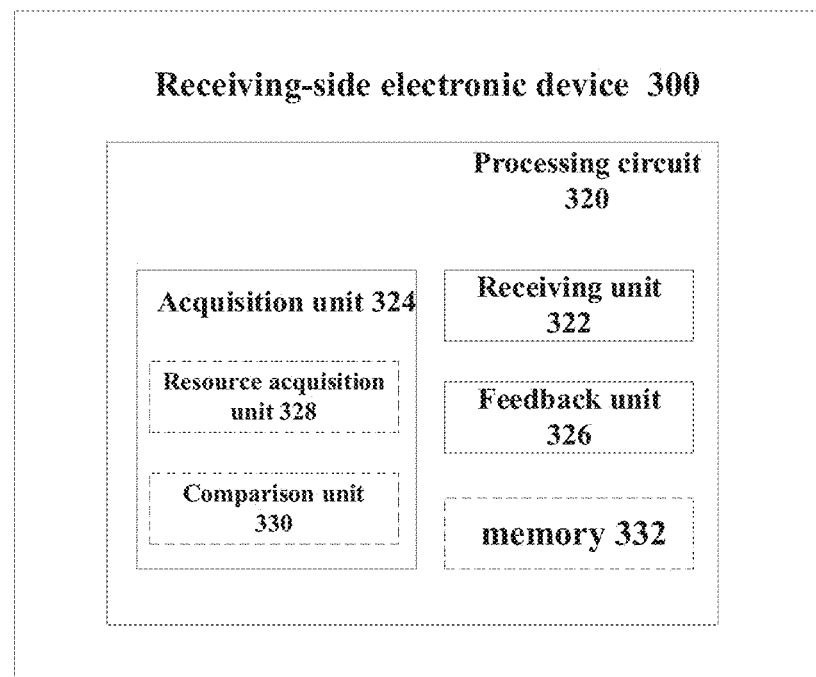
FIG. 3 illustrates a block diagram of a receiving-side electronic device of a wireless communication system according to the present disclosure.

The operation on the receiving side in the improved feedback channel enhancement scheme of the present disclosure will be described below with reference to figures. FIG. 3 illustrates a block diagram of a receiving-side electronic device for the receiving side of a communication system according to the present disclosure, and the electronic device 300 can communicate with more than one transmitting-side electronic devices for the transmitting side of the communication system. The receiving-side electronic device 300 includes a processing circuit 320 configured to receive initial transmission information from a first electronic device among the more than one transmitting-side electronic devices; in case that data information in the initial transmission information cannot be successfully decoded, acquire auxiliary information, which is able to be used to determine resources used by the first electronic device for information retransmission with the receiving-side electronic device; and feed back the auxiliary information to the first electronic device, so that the first electronic device is able to perform the information retransmission by using the resources determined based on the auxiliary information.

According to the embodiment of the present disclosure, the initial transmission information from the transmitting-side electronic device may refer to information related to initial data transmission after the transmitting-side electronic device and the receiving-side electronic device have established communication connection, and may be transmitted to the receiving-side electronic device via PSSCH using pre-selected/allocated resources. The resources may include time-frequency resources, such as allocated time slot and frequency bin. The establishment of communication can be performed in various ways known in the art, and will not be described in detail here.

According to embodiments of the present disclosure, the initial transmission information includes SCI and data to be sent to the receiving-side electronic device. The initial transmission information can adopt various appropriate ways and be arranged on the transmission resources in various appropriate manners. As an example, a part of SCI indicating communication time-frequency resources can be transmitted on PSCCH, and another part of SCI and data can be transmitted on PSSCH. These two transmissions can be carried out by stages, as described above. Of course, the initial transmission information may also contain other information, which will not be described in detail here.

According to embodiments of the present disclosure, when the receiving-side device receives the initial transmission information from the transmitting-side device, SCI in the initial transmission information will be first decoded to know resources for transmission indicated thereby, so that upon receipt of transmitted data, data information transmitted from the transmitting-side device can be extracted from the resources. The decoding of the receiving-side device can be performed in various ways. As an example, in a case where the transmitting side transmits the initial transmission information in stages, the part of SCI information indicating time-frequency resources can first be received and decoded, and then the transmitted data is received and decoded according to the resource position. It should be noted that data transmission on the transmitting side and data reception/decoding on the receiving side can be performed in any suitable way, as long as the transmission resources can be determined first, and then the data information can be obtained according to the resource location.

In embodiments of the present disclosure, the data information in the initial transmission information cannot be successfully decoded especially refers to a case where the SCI in the initial transmission information has been decoded, but the data transmitted from the transmitting-side device cannot be successfully extracted on the resources indicated by the SCI.

In embodiments of the present disclosure, when the data information in the initial transmission information cannot be successfully decoded, the receiving-side device feeds back the auxiliary information to the transmitting-side electronic device. According to embodiments of the present disclosure, the auxiliary information is based on information related to other resources used by other electronic devices in the more than one transmitting-side electronic devices to communicate with the receiving-side electronic device. For example, the auxiliary information may be derived based on the information related to the other resources, or include the information related to the other resources.

According to embodiments of the present disclosure, other resources are acquired by resource sensing of the receiving-side electronic device. According to an example, the resource sensing includes communication reference signal power measurement between the receiving-side electronic device and the other transmitting-side electronic devices in the more than one transmitting-side electronic devices, and resources corresponding to the signal power higher than a specific threshold are taken as the other resources, so that the receiving-side electronic device can collect the resources used by the current communication of the receiving-side electronic device. Herein, this specific threshold can be referred to as "a first specific threshold", which can be appropriately set in various ways, for example, it can be manually set by a user, or it can be set according to statistical information of power in historical communication, relationship between power and communication interference, etc. Generally, the specific threshold is set so that resource corresponding to the signal power higher than the specific threshold is confirmed as the resources that may cause interference. The resource sensing can adopt various resource sensing operations known in the art, for example, the resource sensing process can be performed by measuring L1 SL-RSRP (Layer 1 Side Link Reference Signal Receiving Power).

According to another embodiment, the other resources are obtained based on the receiving-side electronic device decoding the information indicating resources in the initial transmission information from the other transmitting-side electronic devices in the more than one transmitting-side electronic devices. For example, by decoding SCI sent by the other TX UEs, the RX UE obtains the communication resources used by other TX UEs, such as including the time-frequency resources occupied by the currently transmitted PSSCH, and optionally including the time-frequency resources reserved for HARQ retransmission, as described above. In this way, the receiving-side electronic device can also collect resources that have been currently used by other receiving-side electronic devices and reserved resources, which can further reduce the risk of potential resource conflicts.

According to another embodiment, the other resources may be obtained by the RX UE decoding SCI sent by other TX UEs and performing resource sensing. For example, SCI sent by other TX UEs can be decoded first, and then L1 SL-RSRP resource sensing can be performed on the decoded resources, so as to determine the resources exceeding a certain threshold as other resources.

In the embodiments of the present disclosure, the auxiliary information of the present disclosure can be in various suitable forms/information, as long as it can help the transmitting side to make resource determination, especially, as long as the transmitting side can determine whether the selected/reserved resources, especially the reserved retransmission resources, are suitable for data retransmission or not based on the auxiliary information.

According to one embodiment of the present disclosure, the auxiliary information includes information indicating whether the reserved resources of the first device for information retransmission are available. Particularly, whether the reserved resource of the first device for information retransmission is available or not is judged by comparing the reserved resource with other resources obtained as above, and the comparison result is fed back to the transmitting-side electronic device as auxiliary information. The comparison operation may be performed by the receiving-side electronic device, or by other devices connected to the receiving-side electronic device which provide the comparison result to the receiving-side electronic device.

It should be noted that, in this case, the receiving-side electronic device will obtain the information related to the reserved resources of the transmitting-side electronic device for information retransmission in advance. For example, this reserved resource can be notified by the transmitting-side electronic device to the receiving-side electronic device through initial transmission information, for example, included in SCI, so that as an example, the initial transmission information from the transmitting-side electronic device can include information indicating current resources used by the transmitting-side electronic device for current transmission and the reserved resources of the transmitting-side electronic device for information retransmission. Alternatively, the information about the reserved resources can be obtained by the receiving-side electronic device from other devices, such as other devices that have known the reserved resources of the transmitting-side electronic device.

As an example, the auxiliary information includes binary data indicating whether the reserved resources of the first electronic device are available, and the amount of binary data (e.g., the number of bits) is the same as that of the reserved resources, and each binary data indicates whether the corresponding reserved resource is available. For example, if the amount of reserved resources (including the resource for the current transmission) of TX UE are 2, the information fed back by RX UE in PSFCH is 2 bits, and if the reserved resources (including resource for the current transmission) of TX UE are 3, the information fed back by RX UE in PSFCH is 3 bits. Each bit indicates whether the corresponding resource is available, for example, binary data of 1 indicates that the reserved resource is available, and binary data of 0 indicates that the reserved resource is unavailable. In this way, the auxiliary information can contain indication information corresponding to information about the reserved resources, thus intuitively indicating whether the reserved resources indicated by the electronic device on the transmitting side are available, which reduces the communication overhead.

Figure 4A:
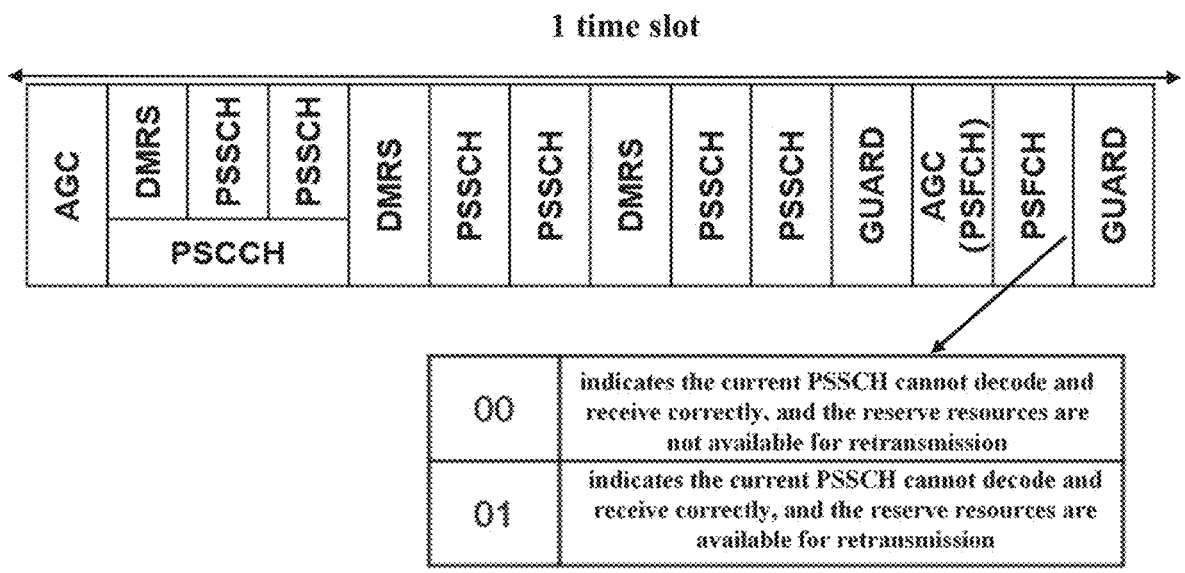
FIGS. 4A and 4B show schematic diagrams of time-frequency resources and information distribution in a communication scenario according to an embodiment of the present disclosure.
Figure 4B:
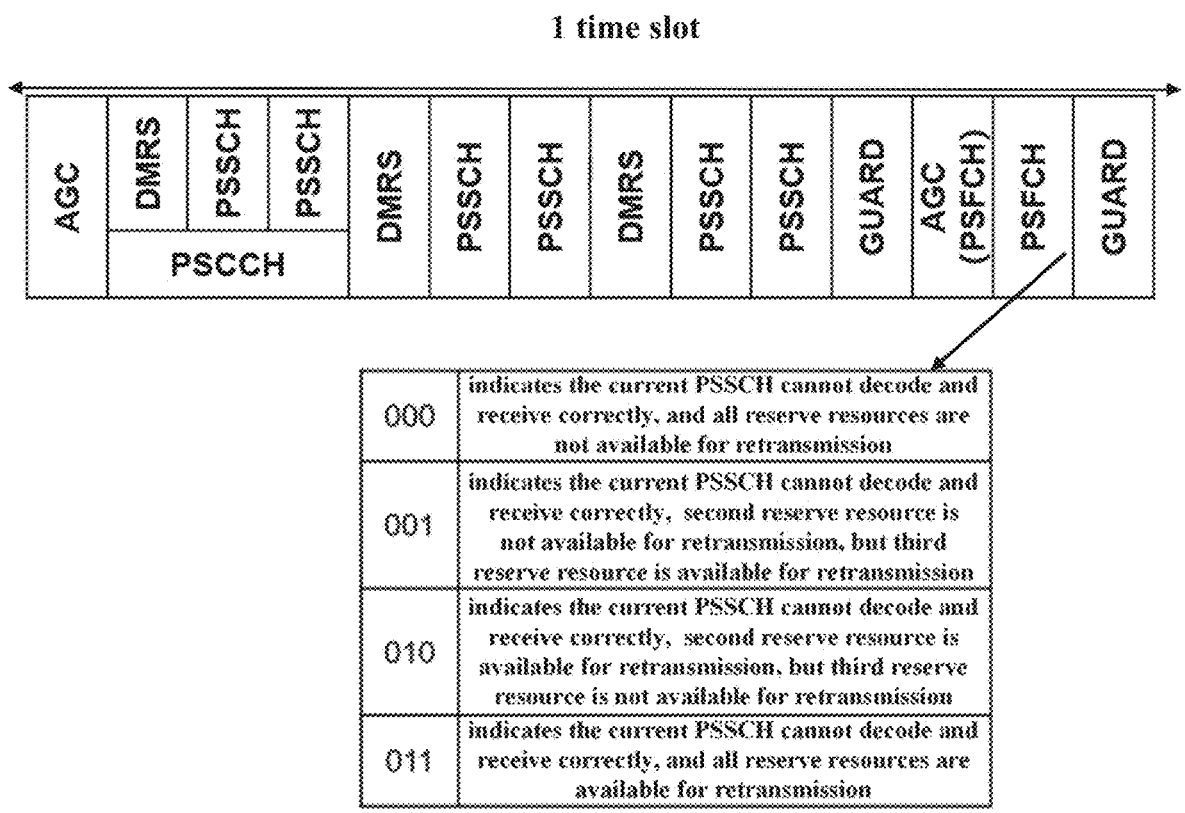

FIGS. 4A and 4B schematically illustrate the distribution of video resources and information in a communication scenario according to an embodiment of the present disclosure, in which it is shown that within one slot, each channel transmits corresponding information by utilizing the occupied frequency domain resources, wherein the transmitted PSSCH and the feedback PSFCH are conceptually illustrated, and AGC, DMRS, and GUARD are well-known transmission labels in the communication field, which will not be described in detail here. FIG. 4A illustrates the information sent and fed back in a scenario where the amount of reserved resources (including the resource for current transmission) for TX UE1 is 2 and the information fed back by RX UE in PSFCH is 2 bits. The PSCCH includes fields, such as frequency resource allocation, time resource allocation and so on, to indicate the positions of time-frequency resources occupied by the current PSSCH and the positions of time-frequency resources reserved for HARQ retransmission, and a 2-bit field is used to indicate whether the reserved retransmission resources are available or not in PSFCH which is feedback when the date is decoded unsuccessfully. The first bit corresponds to the current transmission resources, and the second bit corresponds to reserved retransmission resources, where 00 indicates that the current PSSCH cannot correctly decode the received contents, and the reserved resources are not available for retransmission, and 01 indicates that the current PSSCH cannot correctly decode the received contents, and the reserved resources are available for retransmission; FIG. 4B illustrates the information sent and fed back in a scenario where the amount of reserved resources (including the resource for current transmission) for TX UE1 is 3 and the information fed back by RX UE in PSFCH is 3 bits. The PSCCH includes fields, such as frequency resource allocation, time resource allocation and so on, to indicate the positions of time-frequency resources occupied by the current PSSCH and the positions of time-frequency resources reserved for HARQ retransmission, and a 3-bit field is used to indicate whether the reserved retransmission resources are available or not in PSFCH which is feedback when the date is decoded unsuccessfully. The first to third bits correspond to the current transmission resource and two reserved retransmission resources respectively. Similarly, 0 indicates that the corresponding resources are unavailable and 1 indicates that the corresponding resources are available.

According to another embodiment, the auxiliary information may include resource information indicating other resources used by other electronic devices in the more than one transmitting-side electronic devices for communication transmission with the receiving-side electronic device. In this way, the transmitting-side electronic device receives the information to know the resources for the receiving-side electronic device, and compares the resources with resources allocated/reserved for the transmitting-side electronic device to determine whether the reserved resources are available or not. In this case, the transmitting-side electronic device does not need to send information about the reserved resources, and the judgment process is performed at the transmitting-side device or a device responsible for resource configuration/scheduling, which can save the computation overhead of the receiving-side electronic device to a certain extent.

According to one embodiment, the auxiliary information can be fed back in various appropriate ways. As an example, the auxiliary information can be fed back together with other information, such as NACK. As another example, the auxiliary information can be fed back separately. In this case, it can be pre-arranged between TX UE and RX UE that, if the RX UE receives successfully, no information need to be fed back, and only when the RX UE receives unsuccessfully, feedback can be provided, and only auxiliary information needs to be feedback.

As an example, the auxiliary information can be fed back to the TX UE through PSFCH, and in this case, it is preferable that the auxiliary information is binary data, which can be included in the field transmitted through PSFCH. As an example, in the case of unsuccessful decoding, PSFCH from the Rx UE to its Tx UE carries 1-bit sidelink HARQ feedback to inform NACK, and also contains auxiliary information, which feeds back to the TX UE whether there is resource conflict at the resource position corresponding to the PSFCH, so that the TX UE can judge whether the reserved resources are appropriate according to the information informed by the feedback, and if not, re-select/configure the sidelink resources for retransmission. Of course, if the auxiliary information is retransmitted separately, the 1-bit sidelink HARQ feedback informing NACK may not be transmitted.

In this way, the RX UE feeds back additional auxiliary information to the TX UE, which can help to judge whether the reserved resources of the TX UE collide with the resources used by other TX UEs, and help the TX UE to make proper resource selection for retransmission, thus avoiding retransmission failure due to resource conflict (for example, caused by hidden node problem), and further ensuring high reliability and low delay during retransmission.

According to embodiments of the present disclosure, the processing circuit can be implemented in various ways. The processing circuit 320 may be in the form of a general-purpose processor, or may be a dedicated processing circuit, such as an ASIC. For example, the processing circuit 320 can be configured by a circuit (hardware) or a central processing device such as a central processing unit (CPU). In addition, the processing circuit 320 may carry a program (software) for operating the circuit (hardware) or the central processing device. The program can be stored in a memory (such as arranged in the memory) or an external storage medium connected from the outside, and downloaded via a network (such as the Internet).

According to one embodiment, the processing circuit 320 may include various units for realizing the above functions, such as receiving unit 322 configured to receive initial transmission information from a first electronic device among the more than one transmitting-side electronic devices; acquisition unit 324 configured to, in case that data information in the initial transmission information cannot be successfully decoded, acquire auxiliary information, which is able to be used to determine resources used by the first electronic device for information retransmission with the receiving-side electronic device; and feedback unit 326 configured to feed back the auxiliary information to the first electronic device, so that the first electronic device is able to perform the information retransmission by using the resources determined based on the auxiliary information.

In particular, the acquisition unit 324 may further include a resource acquisition unit 328, which is configured to perform resource sensing to obtain information about other resources used by other electronic devices in the more than one transmitting-side electronic devices for communication transmission with the receiving-side electronic device. As an example, the resource acquisition unit may be configured to perform communication reference signal power measurement between the receiving-side electronic device and the other transmitting-side electronic devices in the more than one transmitting-side electronic devices, and resources corresponding to signal powers higher than a specific threshold are taken as the other resources, and/or the resource acquisition unit may be further configured to decode SCI of other transmitting-side electronic devices to acquire the current communication resources and reserved resources of other transmitting-side electronic devices. Particularly, the acquisition unit 324 may further include a comparison unit 330 configured to compare other resources with the retransmission reserve resources of the first electronic device to determine whether the retransmission reserve resources conflict with the other resources or not, and the comparison result is used as the auxiliary information. The information about other resources acquired by the resource acquisition unit can also be used as auxiliary information.

The above units can operate as described above, and will not be described in detail here. It should be noted that each of the above units only belongs to a logical module classified according to the specific function it implements, instead of limiting its specific implementation manner, for example, it can be implemented in software, hardware, or a combination of software and hardware. In an actual implementation, the foregoing units may be implemented as independent physical entities, or may be implemented by a single entity (for example, a processor (CPU or DSP, etc.), an integrated circuit, etc.). Note that although each unit is shown as a separate unit in FIG. 3, one or more of these units may be combined into one unit or split into multiple units. Furthermore, that the foregoing units are indicated by dotted lines in the figure indicates that the foregoing units may not actually exist, and the operation/functionality they achieve can be implemented by the processing circuit itself.

It should be understood that FIG. 3 is only a schematic structural configuration of the receiving-side electronic device, and alternatively, the receiving-side electronic device 300 may also include other components not shown, such as a memory, a radio frequency link, a baseband processing unit, a network interface, a controller, and the like. The processing circuit may be associated with a memory and/or an antenna. For example, the processing circuit can be directly or indirectly connected to the memory (for example, other components may be interposed therebetween) to access data. For example, the processing circuit may be directly or indirectly connected to the antenna to transmit and receive radio signals via a communication unit.

The memory 332 can store various kinds of information (e.g., data service related information, configuration resource information, etc.) generated by the processing circuit 320, programs and data for the operation of the receiving-side electronic device, data to be transmitted by the receiving-side electronic device, etc. The memory can also be located in the receiving-side electronic device but outside the processing circuit, or even outside the receiving-side electronic device. The memory can be volatile memory and/or nonvolatile memory. For example, the memory may include, but is not limited to, random access memory (RAM), dynamic random access memory (DRAM), static random access memory (SRAM), read only memory (ROM) and flash memory.

Figure 5:
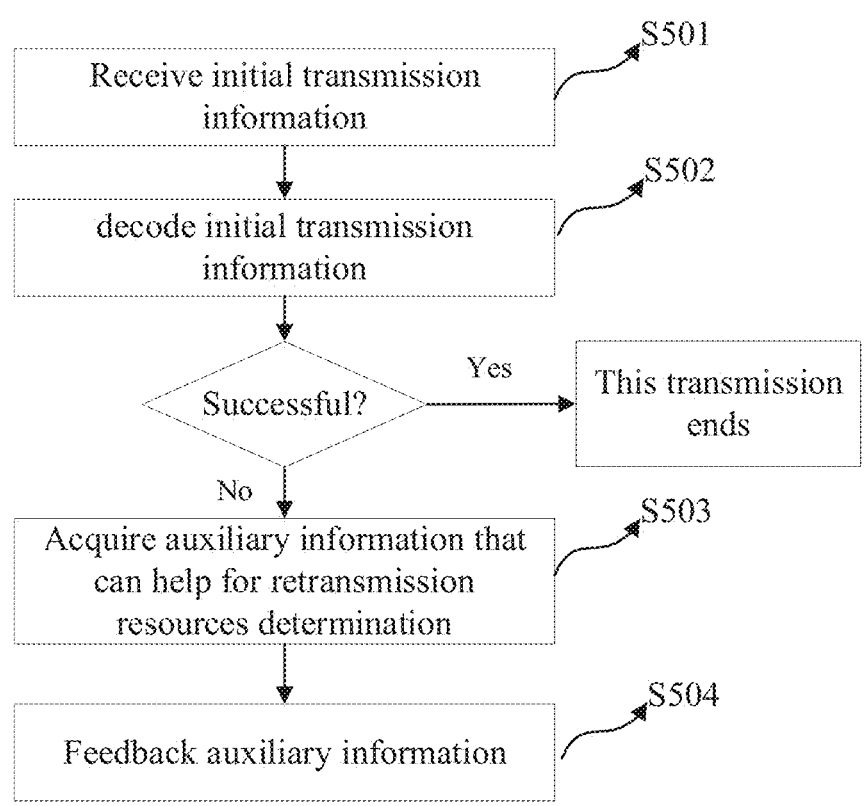
FIG. 5 illustrates a flowchart of a method for a receiving side of a wireless communication system according to the present disclosure.

The method for a receiving side in wireless communication according to the present disclosure will be described below with reference to the figures, and FIG. 5 illustrates a flowchart of the method for the receiving side in wireless communication according to the present disclosure. In the method 500, in step S501, initial transmission information is received from a first electronic device among the more than one transmitting-side electronic devices; in step S502, the initial transmission information is decoded, particularly, SCI in the initial transmission information is decoded to know PSSCH resources for transmitting data, and the transmitted data is further decoded; if the data is successfully decoded, ACK is fed back or no feedback is provided, and the process ends; if the data is unsuccessfully decoded, then proceeds to step S503, in which auxiliary information is acquired, which can be used to determine resources used by the first electronic device for information retransmission with the receiving-side electronic device; and in step S504, the auxiliary information is fed back to the first electronic device, so that the first electronic device can perform the information retransmission by using the resources determined based on the auxiliary information. The auxiliary information can be determined and fed back as described above, and will not be described in detail here.

It should be noted that these steps can be performed by the aforementioned receiving-side electronic device according to the present disclosure, in particular by the corresponding units of the aforementioned receiving-side electronic device according to the present disclosure, or can be performed by an appropriate receiving-side device. It should be noted that the method for the receiving side of the wireless communication system may further include steps of performing the above-mentioned operations performed by the receiving-side electronic device, which will not be described in detail here.

Figure 6:
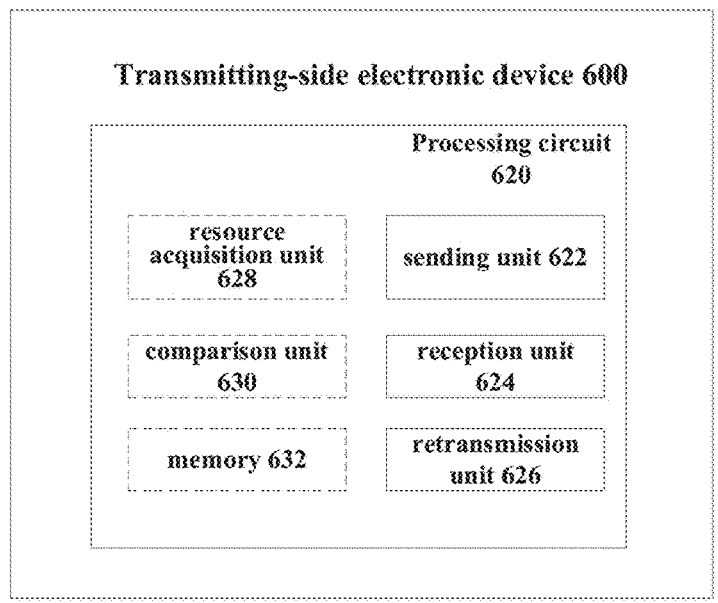
FIG. 6 illustrates a block diagram of a transmitting-side electronic device of a wireless communication system according to the present disclosure.

The transmitting side operation in the improved feedback channel enhancement scheme according to embodiments of the present disclosure will be described below with reference to the figure. FIG. 6 illustrates a block diagram of a transmitting-side electronic device for a transmitting side of a communication system according to the present disclosure, wherein the transmitting-side electronic device 600 is capable of communicating with at least one receiving-side electronic device for a receiving side of the communication system, and the transmitting-side electronic device includes a processing circuit 620 configured to, for each of the at least one receiving-side electronic device, send initial transmission information to the receiving-side electronic device; receive auxiliary information from the receiving-side electronic device, wherein the auxiliary information can be used to determine resources used by the transmitting-side electronic device for information retransmission with the receiving-side electronic device; and perform information retransmission by utilizing the resources determined based on the auxiliary information.

According to embodiments of the present disclosure, the initial transmission information may include SCI and data to be sent to the receiving-side electronic device. The information, form and arrangement of SCI may be as described above, and will not be described in detail here.

According to the embodiment of the present disclosure, the transmitting-side electronic device can inform the receiving-side electronic device whether it can receive the auxiliary information upon establishment of a connection with the receiving-side electronic device. As an example, when the TX UE establishes a connection, such as a unicast connection, it can inform the RX UE whether it can receive additional auxiliary information on PSFCH through PC5 RRC. In this way, if the TX UE can receive the auxiliary information, the RX UE can feed back the auxiliary information through the PSFCH, as described above. As another example, if the TX UE is unable to receive the auxiliary information on PSFCH, the auxiliary information can be provided to the TX UE in other ways, such as via other devices and/or communication channels, which can be pre-arranged between the TX UE and the RX UE.

According to the present disclosure, the resources used for communication between the transmitting-side electronic device and the receiving-side electronic device can be determined in various ways, for example, in a way similar to that in which the receiving-side electronic device determines the resources as described above. As an example, in a case where there are multiple transmitting-side electronic devices, the communication available resources can be determined by performing resource sensing and/or decoding SCIs from other transmitting-side electronic devices. According to one example, the resource sensing includes communication reference signal power measurement, and the resources corresponding to signal powers below a specific threshold are determined as the available communication resources. For example, L1 SL-RSRP is used to perform the resource sensing process, so as to determine the resources which can be used by the transmitting-side electronic device for communication, and which may include the resources for current transmission with the receiving-side electronic device, and additionally include the resources reserved for retransmission. Here, this specific threshold can be called "a second specific threshold", which can be appropriately set in various ways, for example, it can be manually set by a user, or it can be set according to the power statistics in historical communication, channel transmission quality, etc. Generally, the specific threshold is set so that the resource corresponding to a signal power lower than the specific threshold is confirmed as the resource available for signal transmission with appropriate quality. The second specific threshold may be the same as or different from the first specific threshold.

According to another example, the amount n of reserved resources (including resources for current transmission and retransmission resources) can be arbitrarily set, for example, usually 2 or 3, as described above, and in this case, the reserved resources can be arbitrarily selected from the aforementioned available resources set, or the first n of the available resources set which have been sorted according to a specific standard, for example, the first n in a sequence sorted in the order of power from small to large. In this case, the specific threshold can also be considered to be related to the amount, for example, corresponds to the nth power or is slightly greater than the nth power, so that the resource sensing process can acquire the required n resources directly.

According to embodiments of the present disclosure, the determination of available resources can be performed by the transmitting-side electronic device itself, or by other devices responsible for resource allocation/scheduling in the communication system, such as other transmitting-side electronic device (which can be referred to as a master transmitting-side electronic device, master UE).

According to the embodiments of the present disclosure, resources, especially retransmission resources, can be selected based on auxiliary information. The auxiliary information can be determined and fed back by the receiving-side electronic device as described above, and will not be described in detail here. According to the embodiment of the present disclosure, when it is judged by utilizing the auxiliary information that the reserved resources of the transmitting-side electronic device for information retransmission are available, the available reserved resources are used for information retransmission. Under the condition that it is judged by utilizing the auxiliary information that none of the reserved resources of the transmitting-side electronic device for information retransmission is unavailable, newly determined resources can be used for information retransmission. The resource determination can be performed as described above, and will not be described in detail here.

According to an example, when the auxiliary information is binary auxiliary information indicating whether reserved retransmission resources are available, the retransmission resources can be determined according to values in the auxiliary information indicating whether the corresponding reserved resources are available or not. For example, 1 indicates that resources are available, the reserved retransmission resources are used for information retransmission, and 0 indicates that resources are unavailable, the corresponding reserved resources are not used for information retransmission.

As another example, when the auxiliary information is information indicating the communication resources for the receiving side, the communication resources for the receiving side can be compared with the reserved retransmission resources. If they are inconsistent, the reserved retransmission resources are available, then the reserved retransmission resources are used for information retransmission, otherwise, resource determination is performed to re-determine the resources for retransmission. It should be pointed out that when the auxiliary information is information indicating the communication resources for the receiving side, after re-determination of resources for retransmission, the re-determined resources can still be compared with the resources for the receiving side, thus further avoiding possible resource conflicts in the process of re-transmission.

According to the embodiment of the present disclosure, when there exist a plurality of reserved resources available, one of them can be selected for communication retransmission according to a specific rule. For example, if the reserved resources are randomly selected by the TX UE, the reserved resources can also be randomly selected for transmission during transmission, or the resources used for transmission are selected according to the sequence of time occurrence. As another example, the reserved resources have been sorted or marked by priorities when the information is initially transmitted. For example, according to the measured power, the resource with low power has higher priority, so the resource with high priority is preferentially selected for retransmission when multiple reserved resources are available.

According to embodiments of the present disclosure, the above-mentioned resource selection based on the auxiliary information can be performed by the transmitting-side electronic device itself, or by other devices responsible for resource allocation/scheduling in the communication system, such as the master UE. According to one embodiment, auxiliary information is provided to the transmitting-side electronic device for the transmitting-side electronic device to select retransmission resources. According to another embodiment, the auxiliary information can be further transmitted by the transmitting-side electronic device to other devices in the communication system, so that the other devices can determine the resources for information retransmission and inform the resources to the transmitting-side electronic device.

Similar to the processing circuit 320 described above, the processing circuit 620 can be similarly implemented in various ways, for example, it can be in the form of a general-purpose processor or a special processing circuit, such as ASIC. For example, the processing circuit 620 can be configured by a circuit (hardware) or a central processing device (such as a central processing unit (CPU)). In addition, the processing circuit 620 may carry a program (software) for operating the circuit (hardware) or the central processing device. The program can be stored in a memory (such as arranged in the memory) or an external storage medium connected from the outside, and downloaded via a network (such as the Internet).

According to the embodiment of the present disclosure, the processing circuit 620 may include various units for realizing the above functions, for example, a sending unit 622 configured to, for each of the at least one receiving-side electronic device, send initial transmission information to the receiving-side electronic device; a reception unit 624 configured to receive auxiliary information from the receiving-side electronic device, wherein the auxiliary information can be used to determine resources used by the transmitting-side electronic device for information retransmission with the receiving-side electronic device; and a retransmission unit 626 configured to perform information retransmission by utilizing the resources determined based on the auxiliary information. The retransmission unit 626 and the sending unit 622 may be the same unit.

According to an embodiment, the processing circuit 620 may further include a resource determination unit configured to determine resources available for retransmission based on the auxiliary information. Particularly, it is determined whether reserved retransmission resources are available based on the auxiliary information. The resource determination can be performed as described above, and will not be described in detail here.

According to an embodiment, the processing circuit 620 may include a resource sensing unit 628, which performs resource sensing to obtain information about resources used by the sending unit for communication transmission. Particularly, the resource sensing unit 628 can be configured to perform communication reference signal power measurement, and the resources corresponding to signal powers which are below a specific threshold may correspond to available communication resources. The resource sensing unit may operate to acquire resources for transmitting the initial transmission information before transmitting the initial transmission information, or may perform resource sensing during retransmission to acquire new resources available for retransmission.

According to an embodiment, the processing circuit 620 may include a comparison unit 630, which, in a case that the auxiliary information is feedback information about other resources, compares the other resources with the reserved retransmission resources to determine whether the reserved retransmission resources are available.

According to an embodiment, in a case that the communication resources for the sending device are determined by other devices, the sending unit may also send auxiliary information to the other devices so that the other devices can select/determine retransmission resources based on the auxiliary information; the receiving unit can also receive the transmission resource information from the other devices, so as to incorporate the information into the initial transmission information and send it to the receiving-side electronic device.

Each unit can operate as described above, which will not be described in detail here. It should be noted that each of the above units only belongs to a logical module classified according to the specific function it implements, instead of limiting its specific implementation manner, for example, it can be implemented in software, hardware, or a combination of software and hardware. In an actual implementation, the foregoing units may be implemented as independent physical entities, or may be implemented by a single entity (for example, a processor (CPU or DSP, etc.), an integrated circuit, etc.). Note that although each unit is shown as a separate unit in FIG. 6, one or more of these units may be combined into one unit or split into multiple units. Furthermore, that the foregoing units are indicated by dotted lines in the FIG. indicates that the foregoing units may not actually exist, and the operation/functionality they achieve can be implemented by the processing circuit itself.

It should be understood that FIG. 6 is only a schematic structural configuration of the electronic device on the transmitting side. Similar to the implementation of the receiving-side electronic device as described above, the transmitter-side electronic device can also contain other possible components, such as memory, RF link, baseband processing unit, network interface, controller, etc. The processing circuit may be associated with a memory and/or an antenna. The memory can store various information generated by the processing circuit 620 (e.g., data service related information, configuration resource information, etc.), programs and data for the operation of the transmitting-side electronic device, data to be transmitted by the transmitting-side electronic device, etc. The memory may also be located in the transmitting-side electronic device but outside the processing circuit, or even outside the transmitting-side electronic device.

Figure 7:
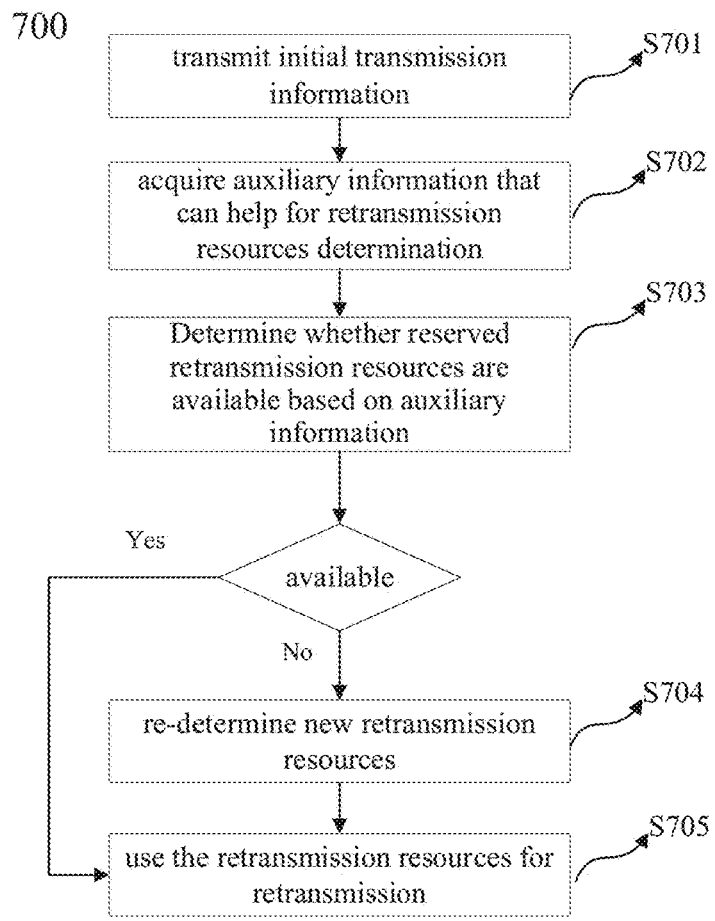
FIG. 7 illustrates a flowchart of a method for a transmitting side of a wireless communication system according to the present disclosure.

The method for the transmitting side in wireless communication according to the present disclosure will be described below with reference to the figures. FIG. 7 illustrates a flowchart of a method for the transmitting side according to the present disclosure. The method 700 includes performing the following steps for each of the receiving-side electronic devices: in step S701, a sending step of sending initial transmission information to the receiving-side electronic device; in step S702, receiving auxiliary information from the receiving-side electronic device, wherein the auxiliary information can be used to determine resources that can be used by the transmitting-side electronic device for information retransmission with the receiving-side electronic device; in step S703, determining whether the reserved resources are suitable for retransmission based on the auxiliary information. If so, in step S705, the reserved resources are used for information retransmission; if not, in step S704, resource sensing is performed to determine new resources, and in step S705, information retransmission is performed by using the newly determined resources.

It should be noted that these steps can be performed by the aforementioned transmitting-side electronic device according to the present disclosure, in particular by corresponding units of the aforementioned transmitting-side electronic device according to the present disclosure, or can be performed by an appropriate transmitting-side device.

The feedback channel enhancement according to an embodiment of the present disclosure will be described below by taking the resource allocation mode 2 in the NR V2X sidelink communication scenario as an example. The NR V2X sidelink communication scenario may include: a sidelink unicast communication scenario without a master UE in the resource allocation mode 2, a sidelink unicast communication scenario with a master UE in the resource allocation mode 2, sidelink multicast communication scenario in the resource allocation mode 2. Embodiments of various scenarios will be described below with reference to figures. It should be noted that the following description is only exemplary, and the concept of the present disclosure can be actually applied to any other suitable application scenario, as long as in such scenario, the transmitting-side device is capable of data retransmission while the selection and reservation of resources for data transmission are made without knowing other transmitting-side devices.

Figure 8:
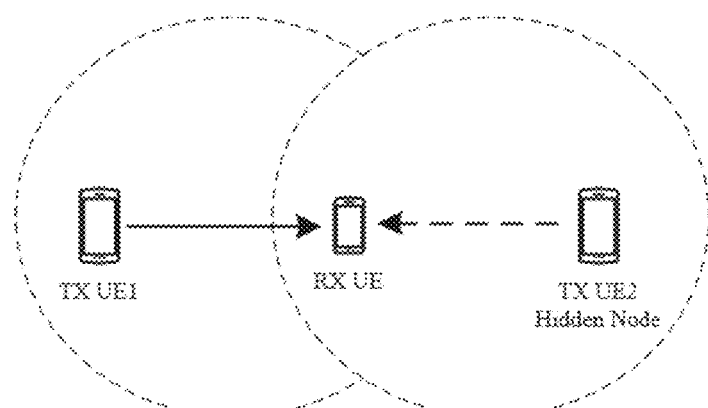
FIG. 8 illustrates a scenario diagram according to a first embodiment of the present disclosure.
Figure 9:
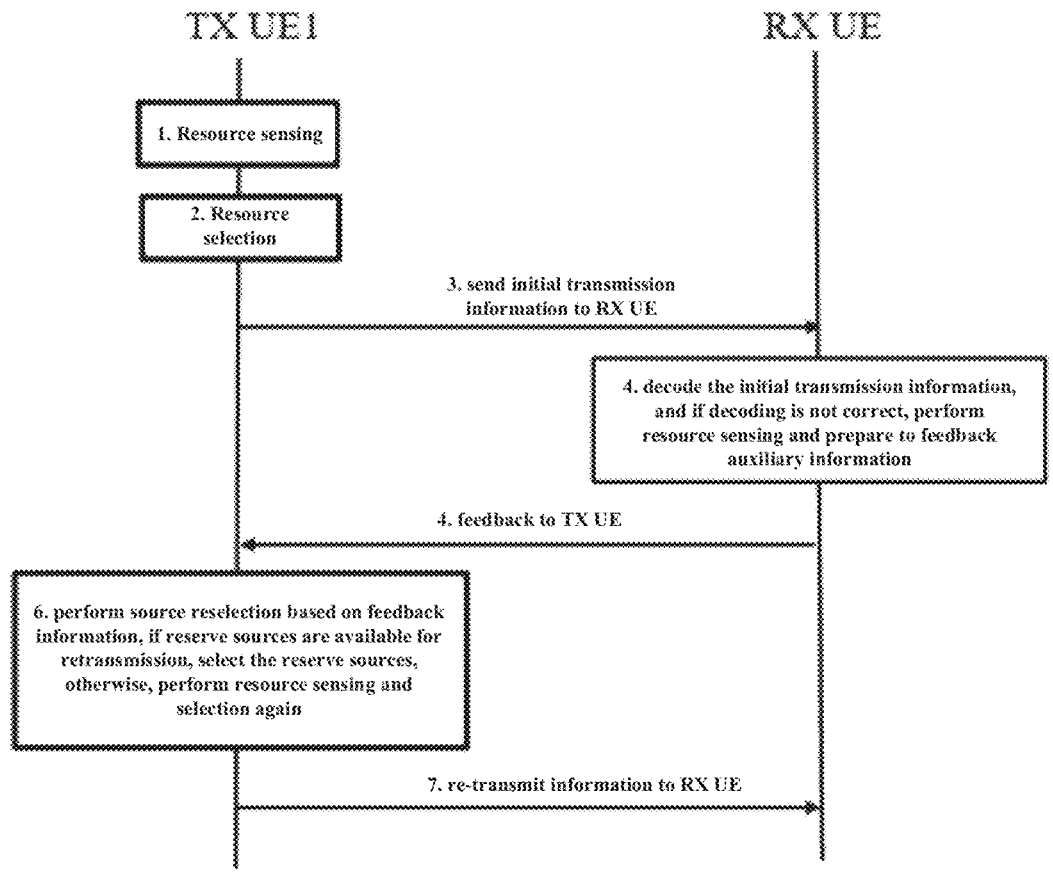
FIG. 9 illustrates a signaling diagram according to a first embodiment of the present disclosure.

FIG. 8 illustrates a communication scenario according to a first embodiment of the present disclosure, corresponding to a sidelink unicast communication scenario without a master UE in the resource allocation mode 2, wherein TX UE1 performs unicast communication with RX UE through sidelink, TX UE1 itself performs resource selection and reservation through resource sensing, and there exists a hidden node TX UE2 which also communicates with RX UE. FIG. 9 illustrates a diagram of signaling between TX UE1 and RX UE according to the first embodiment of the present disclosure.

1. TX UE1 sends initial transmission information to RX UE.

When TX UE1 establishes unicast connection with RX UE, TX UE1 informs RX UE whether it has an ability to receive additional auxiliary information on PSFCH or not through PC5 RRC, and RX UE chooses whether to feed back the additional auxiliary information on PSFCH or not according to TX UE1's ability. 1 means that TX UE1 has the ability to receive additional auxiliary information on PSFCH; 0 means that TX UE1 cannot receive additional auxiliary information on PSFCH; or RX UE knows whether TX UE1 has the ability to receive additional auxiliary information on PSFCH or not through RRC pre-configuration. RX UE chooses whether to feed back additional auxiliary information on PSFCH or not according to TX UE1's ability.

After having established unicast connection between TX UE1 and RX UE, TX UE1 decodes SCI sent by other TX UEs and performs resource sensing process by measuring L1 SL-RSRP, to acquire available resources. TX UE1 selects resources from the acquired available resources, and utilizes the selected resources to send initial transmission information to RX UE. The SCI of the initial transmission information indicates time-frequency resources occupied by the currently transmitted PSSCH, and time-frequency resources reserved for HARQ retransmission. The resource sensing and resource selection herein can be performed in various ways known in the art, and will not be described in detail here.

2. RX UE receives the initial transmission information from TX UE1 and provides feedback.

The RX UE decodes the SCI sent by TX UE1, receives the currently transmitted PSSCH through SCI decoding, and knows the reserved resources of TX UE for HARQ retransmission through SCI. Particularly, if the RX UE can feed back additional auxiliary information on the PSFCH, the RX UE can feed back the auxiliary information generated based on the resource determination at the RX UE side to the TX UE1, so as to help resource selection at the TX UE side during retransmission.

Particularly, if RX UE correctly decodes the initial transmission information from TX UE1, RX UE feeds back ACK to TX UE1 through PSFCH, or does not provide feedback. If the RX UE cannot successfully decode the PSSCH initially transmitted by the TX UE, the RX UE will decode the SCI sent by other TX UEs, and perform the resource sensing process by measuring L1 SL-RSRP, judge whether the reserved resources used by TX UE for HARQ retransmission conflict with the resources used by other UEs, and prepare auxiliary information for feedback. If RX UE can feed back additional auxiliary information on PSFCH, and the amount of reserved resources (including resources for current transmission) of TX UE1 are 2, the information fed back by RX UE in PSFCH is 2 bits, and if the amount of reserved resources (including resources for current transmission) of TX UE1 are 3, the information fed back by RX UE in PSFCH is 3 bits. Each bit indicates whether the corresponding PSSCH resource is available. If RX UE judges that the reserved resources used by TX UE for HARQ retransmission conflict with the resources used by other TX UEs, RX UE feeds back 0 to TX UE at the corresponding resource position in PSFCH, indicating that the corresponding reserved resources is not available for retransmission; otherwise, it feeds back 1, indicating that the corresponding reserved resources can be used for retransmission.

3. TX UE1 retransmits information to RX UE

The TX UE receives the feedback information sent by the RX UE and determines whether there are resources available for retransmission in the reserved resources or not according to the feedback information, and if so, the TX UE performs retransmission to the RX UE by using the reserved resources; if not, the TX UE makes resource selection again for retransmission to the RX UE. The re-selection of resources may be that the TX UE 1 performs the resource sensing process again to determine the resources for retransmission.

Figure 10:
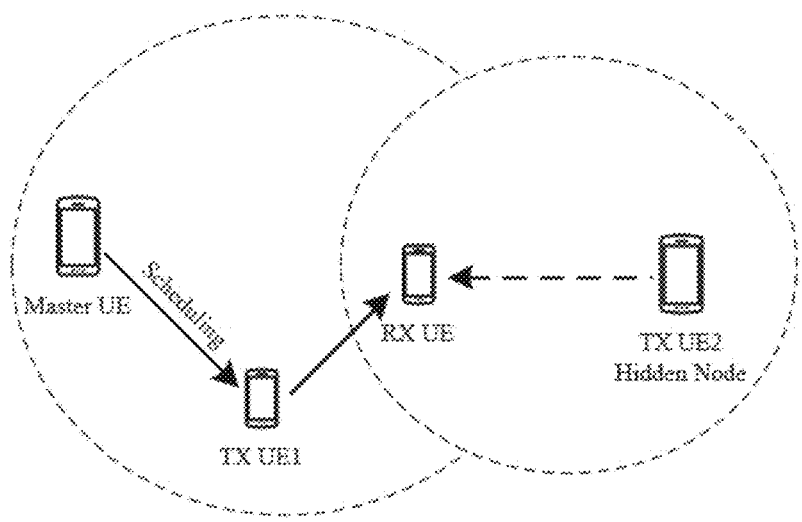
FIG. 10 illustrates a scenario diagram according to a second embodiment of the present disclosure.
Figure 11:
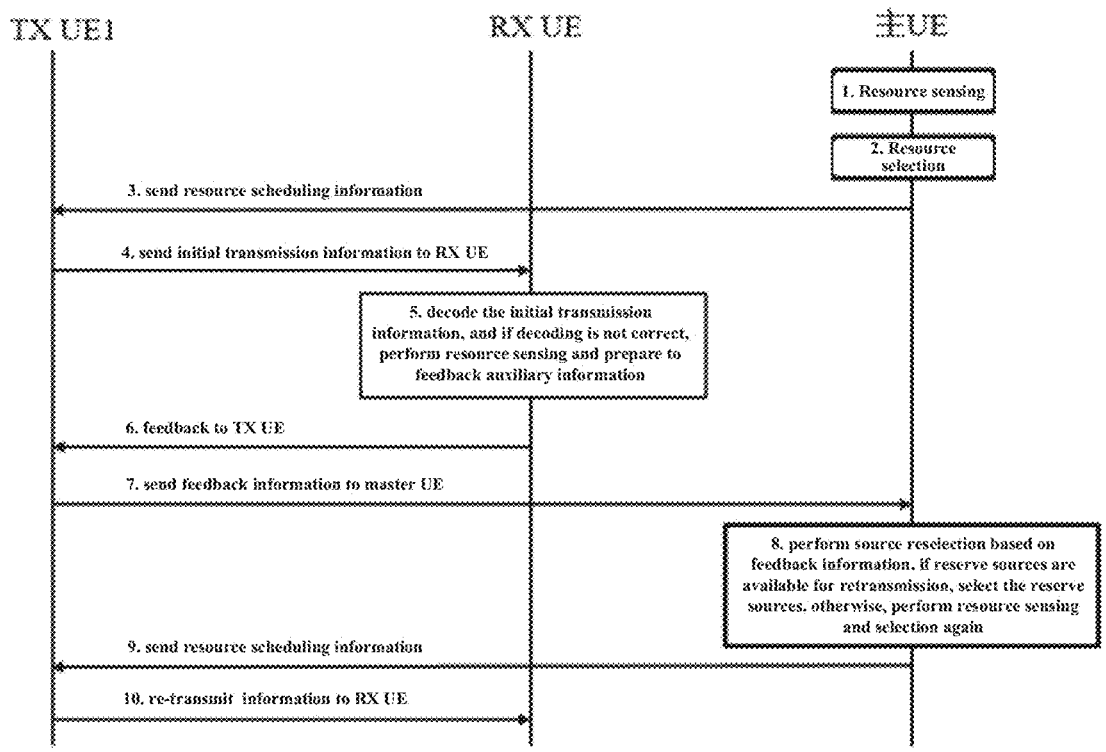
FIG. 11 illustrates a signaling diagram according to a second embodiment of the present disclosure.

FIG. 10 illustrates a communication scenario according to the second embodiment of the present disclosure, which corresponds to a sidelink unicast communication scenario with a master UE in resource allocation mode 2, in which TX UE1 performs unicast communication with RX UE, and the selection and reservation of communication resources for TX UE1 is performed by other devices, for example, another transmitting-side device as the master TX UE. The master TX UE can make resource selection and reservation for the TX UE without knowing the resource selection and reservation for other TX UEs. In addition, there exists a hidden node TX UE2 which also communicates with RX UE. FIG. 11 illustrates a diagram of signaling between TX UE1 and RX UE according to the second embodiment of the present disclosure.

1. Master UE sends resource scheduling information to TX UE1.

When TX UE1 establishes unicast connection with RX UE, TX UE1 informs RX UE whether it has an ability to receive additional auxiliary information on PSFCH or not through PC5 RRC, and RX UE chooses whether to feed back the additional auxiliary information on PSFCH or not according to TX UE1's ability. 1 means that TX UE1 has the ability to receive additional auxiliary information on PSFCH; 0 means that TX UE1 cannot receive additional auxiliary information on PSFCH; or RX UE knows whether TX UE1 has the ability to receive additional auxiliary information on PSFCH or not through RRC pre-configuration. RX UE chooses whether to feed back additional auxiliary information on PSFCH or not according to TX UE1's ability.

The master UE acquires available resources by decoding SCI sent by other TX UEs and performing resource sensing process by measuring L1 SL-RSRP, sends resource scheduling information to TX UE1, to indicate the resources which can be used by TX UE1 for communication transmission. The resource sensing and resource selection herein can be performed in various ways known in the art, and will not be described in detail here.

2. TX UE1 initially transmits information to RX UE

According to the resource scheduling of the master UE, TX UE1 sends the initial transmission information to RX UE using the scheduled resources, and the SCI of the initial transmission information indicates the time-frequency resources occupied by the currently transmitted PSSCH and the reserved time-frequency resources used for HARQ retransmission.

3. RX UE receives the initial transmission information from TX UE1 and provides feedback The RX UE decodes the SCI sent by TX UE1, receives the currently transmitted PSSCH through SCI decoding, and knows the reserved resources of TX UE for HARQ retransmission through SCI. Particularly, if the RX UE can feed back additional auxiliary information on the PSFCH, the RX UE can feed back the auxiliary information generated based on the resource determination at the RX UE side to the TX UE1, so as to help resource selection at the TX UE side during retransmission.

1) If RX UE correctly decodes the initial transmission information from TX UE1, RX UE feeds back ACK ack to TX UE1 through PSFCH.

2) If RX UE cannot correctly decode the initial transmission information from TX UE1, the RX UE will decode the SCI sent by other TX UEs and perform the resource sensing process by measuring L1 SL-RSRP, to judge whether the reserved resources used by TX UE1 for HARQ retransmission conflict with the resources used by other UEs or not, and prepare information for feedback. For example, if the amount of reserved resources (including resources for current transmission) of TX UE1 are 2, the information fed back by RX UE in PSFCH is 2 bits, and if the amount of reserved resources (including resources for current transmission) of TX UE1 are 3, the information fed back by RX UE in PSFCH is 3 bits. Each bit indicates whether the corresponding PSSCH resource is available. If RX UE judges that the reserved resources used by TX UE1 for HARQ retransmission conflict with the resources used by other TX UEs, RX UE feeds back 0 to TX UE1 at the corresponding resource position in PSFCH, indicating that the corresponding reserved resources is not available for retransmission; otherwise, it feeds back 1, indicating that the corresponding reserved resources can be used for retransmission.

4. The master UE re-schedules resources for TX UE1 for retransmission.

Upon receipt of the feedback information from TX UE, TX UE1 sends the feedback information to the master UE through PSFCH.

The master UE receives the feedback information sent by TX UE1, determines whether there are resources available for retransmission in the reserved resources or not according to the feedback information, and if so, schedules the reserved resources to instruct TX UE1 to retransmit to RX UE; if not, the master UE selects resources again and sends resource scheduling information to TX UE1, so that TX UE1 retransmits to RX UE based on the scheduled resources.

Figure 12:
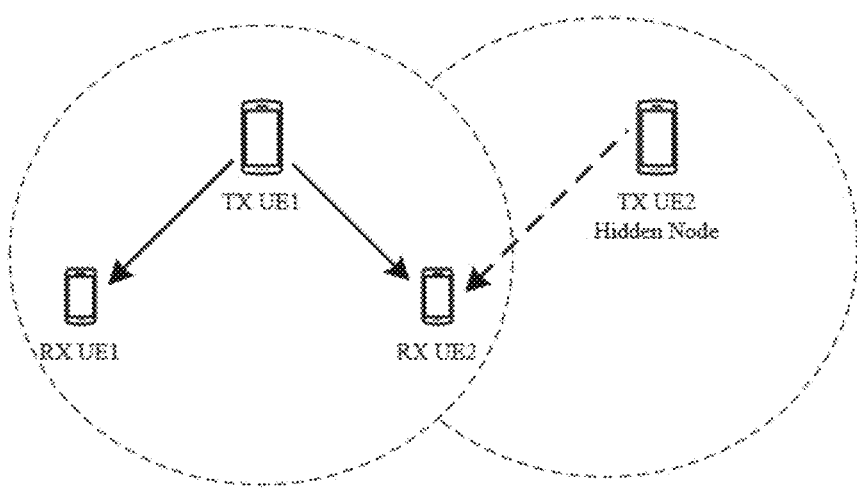
FIG. 12 illustrates a scenario diagram according to a third embodiment of the present disclosure.
Figure 13:
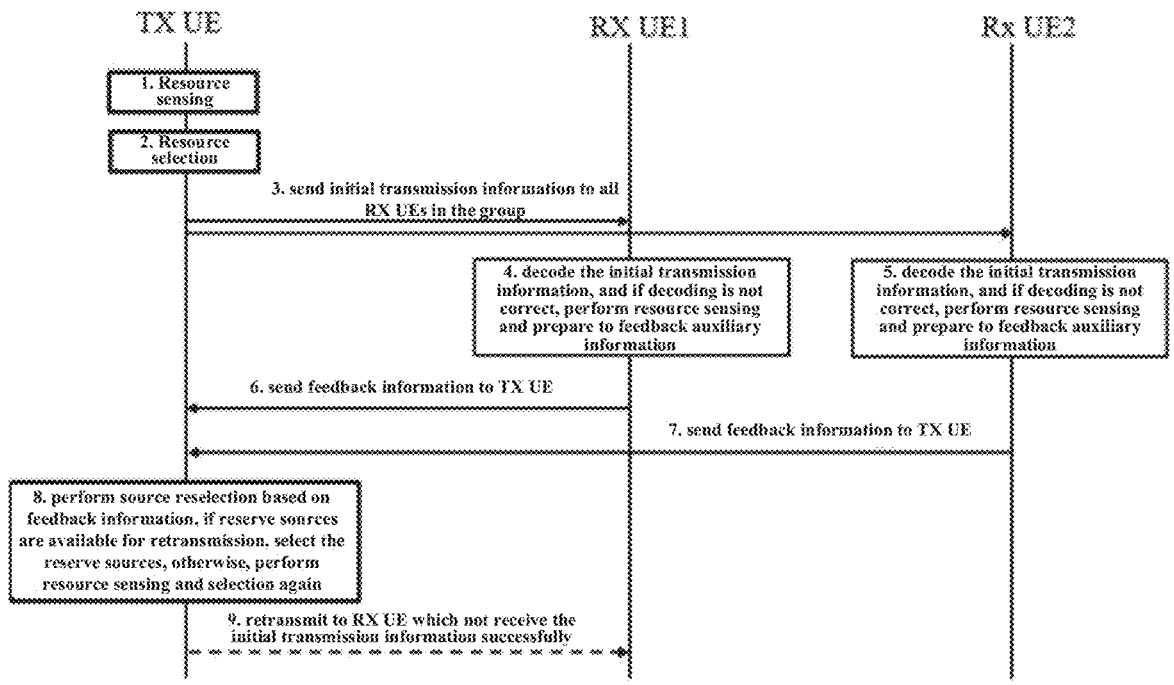
FIG. 13 illustrates a signaling diagram according to a third embodiment of the present disclosure.

FIG. 12 illustrates a communication scenario according to a third embodiment of the present disclosure, which corresponds to a sidelink multicast communication scenario in resource allocation mode 2, in which TX UE1 performs multicast communication to a group of multiple RX UEs (including RX UE1 and RX UE2), and TX UE1 itself or other devices other than TX UE1 (such as the aforementioned master UE) perform selection and reservation of communication resources for TXUE1. In addition, there exists a hidden node TX UE2 which also communicates with RX UE2. FIG. 13 illustrates a signaling diagram of multicast communication between TX UE1 and RX UE1 and RX UE 2 according to the third embodiment of the present disclosure.

1. TX UE1 initially transmits information to a group of RX UE.

When TX UE1 establishes a multicast, TX UE1 informs all RX UEs in the group whether it has an ability to receive additional auxiliary information on PSFCH or not through 1-bit reserve position on SCI. 1 means that TX UE1 has the ability to receive additional auxiliary information on PSFCH; 0 means that TX UE1 cannot receive additional auxiliary information on PSFCH; or RX UE knows whether TX UE1 has the ability to receive additional auxiliary information on PSFCH or not through RRC pre-configuration. RX UE chooses whether to feed back additional auxiliary information on PSFCH or not according to TX UE1's ability.

TX UE1 decodes SCI sent by other TX UEs and performs resource sensing process by measuring L1 SL-RSRP, to acquire available resources. TX UE1 selects resources from the acquired available resources, and utilizes the selected resources to send initial transmission information to all RX UEs in the group. The SCI of the initial transmission information indicates time-frequency resources occupied by the currently transmitted PSSCH, and time-frequency resources reserved for HARQ retransmission.

2. All RX UEs in the group receive the initial transmission information from TX UE1 and provide feedback.

All RX UEs in the group decode the SCI sent by TX UE1, decode the currently transmitted PSSCH through SCI, and know the reserved resources of TX UE1 for HARQ retransmission through SCI. Particularly, if the RX UE can feed back additional auxiliary information on the PSFCH, the RX UE can feed back the auxiliary information generated based on the resource determination at the RX UE side to the TX UE1, so as to help resource selection at the TX UE side during retransmission.

1) if RX UE correctly decodes and receives the initial transmission information from TX UE1

In accordance with configuration, the RX UE feeds back ACK to TX UE1 through PSFCH, or does not provide feedback.

2) if RX UE cannot correctly decode and receive the initial transmission information from TX UE1, RX UE will decode the SCI sent by other TX UEs and perform the resource sensing process by measuring L1 SL-RSRP, to judge whether the reserved resources used by TX UE1 for HARQ retransmission conflict with the resources used by other UEs or not, and prepare information for feedback. If the RX UE can feed back additional auxiliary information on the PSFCH, and the amount of reserved resources (including resources for current transmission) of TX UE1 are 2, the information fed back by RX UE in PSFCH is 2 bits, and if the amount of reserved resources (including resources for current transmission) of TX UE1 are 3, the information fed back by RX UE in PSFCH is 3 bits. If RX UE judges that the reserved resources used by TX UE1 for HARQ retransmission conflict with the resources used by other TX UEs, RX UE feeds back 0 to TX UE1 at the corresponding resource position in PSFCH, indicating that the corresponding reserved resources is not available for retransmission; otherwise, it feeds back 1, indicating that the corresponding reserved resources can be used for retransmission.

3. TX UE1 retransmits to RX UE that does not correctly decode and receive the initial transmission information.

The TX UE receives the feedback information from all RX UEs in the group, determines whether there are resources available for retransmission in the reserved resources or not according to the feedback information, and if there are reserved resources available for retransmission, retransmits to all RX UEs that need retransmission by using the reserved resources; If there are no reserved resources available for retransmission, the TX UE performs the resource selection process again, and retransmits to all RX UEs that need retransmission.

It should be pointed out that in the above-mentioned third embodiment, the selection/scheduling of resources is performed by TX UE1 itself, but it shall be understood that the selection/scheduling of resources can also be performed by devices other than TX UE1, such as the master UE in the second embodiment, and in this case, the selection/scheduling of communication resources for initial transmission of information and the determination of retransmission resources based on auxiliary information can all be performed by the master UE, and the operations can be that in the second embodiment, which will not be described in detail here.

From the above, it can be seen that in a scenario, such as resource allocation mode 2 in sidelink communication in wireless communication, where the transmission resources of a transmitting-side electronic device is selected/allocated without knowing the transmission resources of other specific transmitting-side electronic devices (especially other transmitting-side electronic device that the transmitting-side electronic device can't sense, for example, other transmitting-side electronic devices outside the communication range of the transmitting-side electronic device but within the communication range of the receiving-side electronic device), the transmission resources of the transmitting-side electronic device may conflict with the resources of other transmitting-side electronic devices, and thereby cause communication failure, especially retransmission communication failure. In view of this, the present disclosure proposes that the receiving-side electronic device feeds back additional auxiliary information to the transmitting-side electronic device, where the auxiliary information is determined based on communication resources on the receiving side known by the receiving-side electronic device, so that the transmitting-side electronic device can make appropriate resource selection/configuration based on the auxiliary information during communication transmission, especially retransmission, and especially can judge in advance whether the reserved retransmission resources conflict with the resources used by other transmitting-side electronic devices or not, whether the reserved retransmission resources can be used for information retransmission or not, and if not, re-select/allocate new resources for retransmission, which can effectively avoid retransmission failure caused by resource conflict and ensure high reliability and low delay of retransmission.

RX UE feeds back additional auxiliary information to TX UE through PSFCH, indicating whether the reserved resources of TX UE conflict with the resources used by other TX UE, assisting TX UE in resource selection during retransmission, thus avoiding retransmission failure due to hidden node problem, and further ensuring high reliability and low delay during retransmission.

APPLICATION EXAMPLES

In this disclosure, an example of sidelink communication scenario in V2X is described, but it should be understood that the application scenarios of this disclosure are not limited to cooperative communication scenarios in a platooning. The improved scheme proposed in this disclosure can be applied to any cooperative communication application scenario, such as UAV formation flight, intelligent factory robot cooperative operation, etc.

It should be noted that the above description is only exemplary. The disclosed embodiments can also be executed in any other appropriate way, and still achieve the advantageous effects obtained by the disclosed embodiments. Furthermore, the embodiments of the present disclosure can also be applied to other similar application examples, and the advantageous effects obtained by the embodiments of the present disclosure can still be achieved.

It should be understood that the machine-executable instructions in the machine-readable storage medium or program product according to the embodiments of the present disclosure may be configured to perform operations corresponding to the above-mentioned device and method embodiments. When referring to the above device and method embodiments, the embodiments of the machine-readable storage medium or program product are clear to those skilled in the art, and therefore will not be described repeatedly. Machine-readable storage medium and program products for vehiclerying or including the above-mentioned machine-executable instructions also fall within the scope of the present disclosure. Such a storage medium may include, but is not limited to, a floppy disk, an optical disk, a magneto-optical disk, a memory vehicled, a memory stick, and the like.

Figure 14:
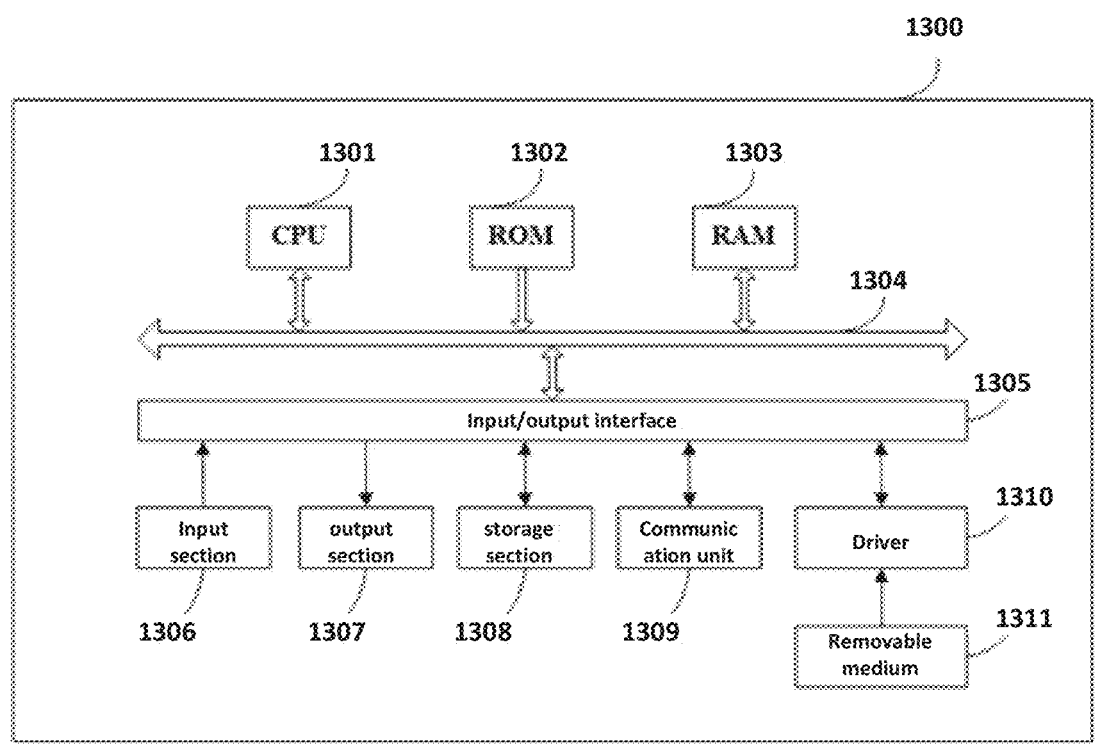
FIG. 14 illustrates a block diagram showing an exemplary hardware configuration of a computer system capable of implementing an embodiment of the present invention.

In addition, it should be understood that the processes and devices described above may also be implemented by software and/or firmware. When implemented by software and/or firmware, a program constituting the software is installed from a storage medium or a network to a computer having a dedicated hardware structure, such as a general-purpose personal computer 1300 shown in FIG. 14, and the computer can perform a variety of functions by installing various programs thereon. FIG. 14 is a block diagram illustrating an example structure of a personal computer as an information processing apparatus that can be adopted in an embodiment of the present disclosure. In one example, the personal computer may correspond to the above-described exemplary transmitting device or terminal-side electronic device according to the present disclosure.

In FIG. 14, a central processing unit (CPU) 1301 performs various processes according to a program stored in a read only memory (ROM) 1302 or a program loaded from a storage section 1308 to a random-access memory (RAM) 1303. In the RAM 1303, data required when the CPU 1301 executes various processes and the like is also stored as necessary.

The CPU 1301, the ROM 1302, and the RAM 1303 are connected to each other via a bus 1304. An input/output interface 1305 is also connected to the bus 1304.

The following components are connected to the input/output interface 1305: an input section 1306 including a keyboard, a mouse, etc.; an output section 1307 including a display, such as a cathode ray tube (CRT), a liquid crystal display (LCD), etc., and a speaker, etc.; a storage section 1308 including hard disks, etc.; and communication section 1309 including network interface vehicleds such as LAN vehicleds, modems, etc. The communication section 1309 performs communication processing via a network such as the Internet.

A driver 1310 is also connected to the input/output interface 1305 as needed. A removable medium 1311 such as a magnetic disk, an optical disk, a magneto-optical disk, a semiconductor memory, etc. is installed on the drive 1310 as needed, so that a computer program read out therefrom can be installed into the storage section 1308 as needed.

In a case where the above-mentioned processes are realized by a software, the programs constituting the software are installed from a network such as the Internet or a storage medium such as a removable medium 1311.

Those skilled in the art should understand that such a storage medium is not limited to the removable medium 1311 shown in FIG. 14 in which the program is stored and which is distributed separately from the device to provide the program to the user. Examples of the removable medium 1311 include a magnetic disk (including a floppy disk (registered trademark)), an optical disk (including a CD-ROM and a digital versatile disk (DVD)), and a magneto-optical disk (including a mini disk (MD) (registered trademark))) and semiconductor memory. Alternatively, the storage medium may be the ROM 1302, a hard disk included in the storage section 1608, and the like, in which programs are stored and which are distributed to users along with the device containing them.

The technology of the present disclosure can be applied to various products, especially various products between which sidelink communication or similar communication manner can be performed and which comply with the resource allocation mode 2. For example, the transmitting-side electronic device and/or receiving-side electronic device according to embodiments of the present disclosure can be implemented as certain module in a variety of control devices/base stations, or be included therein. For example, the transmitting-side electronic device and/or receiving-side electronic device according to embodiments of the present disclosure can be implemented as a variety of terminal devices or be included in a variety of terminal devices.

For example, the transmitting-side electronic device/base stations mentioned in this disclosure can be implemented as any type of base station, for example, evolved Node B (eNB), such as macro eNB and small eNB. A small eNB may be an eNB covering a cell smaller than a macro cell, such as a pico eNB, a micro eNB, and a home (femto) eNB. Furthermore, for example, the transmitting-side electronic device/base stations can be implemented as gNB, such as macro gNB and small gNB. A small gNB may be a gNB covering a cell smaller than a macro cell, such as a pico gNB, a micro gNB, and a home (femto) gNB. Alternatively, the base station can be implemented as any other type of base station, such as a NodeB and a Base Transceiver Station (BTS). The base station may include: a main body (also referred to as a base station device) configured to control wireless communication; and one or more remote radio heads (RRHs) disposed at a place different from the main body. In addition, various types of terminals described below can work as base stations by temporarily or semi-persistently performing base station functions.

For example, in some embodiments, the terminal device mentioned in this disclosure can be implemented as a mobile terminal such as a smart phone, a tablet personal computer (PC), a notebook PC, a portable gaming terminal, a portable/dongle Mobile routers and digital cameras, or vehicle terminals such as vehicle navigation equipment. The terminal device can also be implemented as a terminal that performs machine-to-machine (M2M) communication, also called as a machine type communication (MTC) terminal. In addition, the terminal device may be a wireless communication module mounted on each of the terminals described above, such as an integrated circuit module including a single chip.

Examples according to the present disclosure will be described below with reference to the figures.

[Example of Base Station]

It should be understood that the term "base station" in this disclosure has the full breadth of its usual meaning and includes at least a wireless communication station that is used as part of a wireless communication system or radio system for facilitating communication. Examples of base stations may be, for example but not limited to, the following: maybe one or both of a base transceiver station (BTS) and a base station controller (BSC) in a GSM system, may be one or both of a radio network controller (RNC) and Node B in a WCDMA system, may be eNBs in LTE and LTE-Advanced systems, or may be corresponding network nodes in future communication systems (such as gNB, eLTE eNB, etc that may appear in 5G communication systems). Part of the functions in the base station of the present disclosure can also be implemented as an entity with control function for communication in D2D, M2M, and V2V communication scenarios, or as an entity that plays a spectrum coordination role in cognitive radio communication scenarios.

First Example

Figure 15:
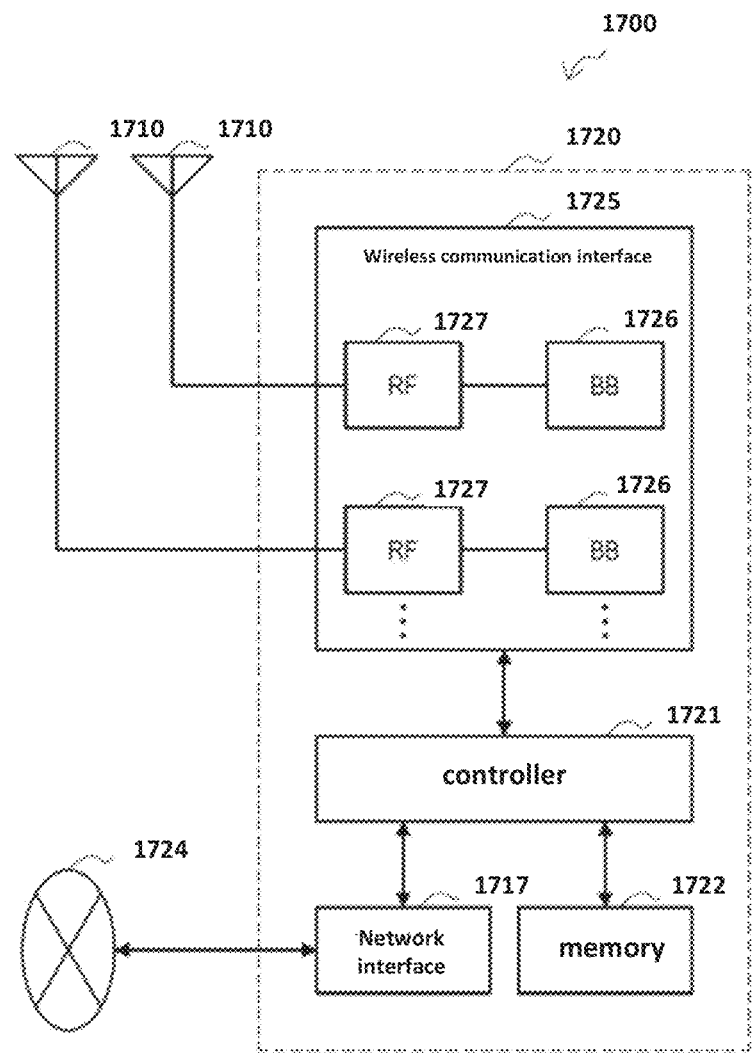
FIG. 15 is a block diagram illustrating a first example of a schematic configuration of an eNB to which the technology of the present disclosure can be applied.

FIG. 15 is a block diagram illustrating a first example of a schematic configuration of a gNB to which the technology of the present disclosure can be applied. The gNB 1700 includes a plurality of antennas 1710 and a base station device 1720. The base station device 1720 and each antenna 1710 may be connected to each other via an RF cable. In an implementation manner, the gNB 1700 (or the base station device 1720) herein may correspond to the above-mentioned transmitting-side and/or receiving-side electronic device.

Each of the antennas 1710 includes a single or multiple antenna elements, such as multiple antenna elements included in a multiple-input multiple-output (MIMO) antenna, and is used for the base station device 1720 to transmit and receive wireless signals. As shown in FIG. 15, the gNB 1700 may include a plurality of antennas 1710. For example, multiple antennas 1710 may be compatible with multiple frequency bands used by gNB 1700.

The base station device 1720 includes a controller 1721, a memory 1722, a network interface 1717, and a wireless communication interface 1725.

The controller 1721 may be, for example, a CPU or a DSP, and operates various functions of the base station device 1720 at a higher layer. For example, the controller 1721 determines position information about a target terminal device in at least one terminal device on the terminal side of a wireless communication system based on the location information and specific position configuration information about the at least one terminal device acquired via a wireless communication interface 1725. The controller 1721 may have logical functions that perform controls such as radio resource control, radio bearer control, mobility management, admission control, and scheduling. The controls can be performed in conjunction with a nearby gNB or core network node. The memory 1722 includes a RAM and a ROM, and stores a program executed by the controller 1721 and various types of control data such as a terminal list, transmission power data, and scheduling data.

The network interface 1717 is a communication interface for connecting the base station device 1720 to the core network 1724. The controller 1721 may communicate with a core network node or another gNB via the network interface 1717. In this case, the gNB 1700 and the core network node or other gNBs may be connected to each other through a logical interface such as an Si interface and an X2 interface. The network interface 1717 may also be a wired communication interface or a wireless communication interface for a wireless backhaul line. If the network interface 1717 is a wireless communication interface, compared with the frequency band used by the wireless communication interface 1725, the network interface 1717 can use a higher frequency band for wireless communication.

The wireless communication interface 1725 supports any cellular communication scheme such as Long Term Evolution (LTE) and LTE-Advanced, and provides a wireless connection to a terminal located in a cell of the gNB 1700 via an antenna 1710. The wireless communication interface 1725 may generally include, for example, a baseband (BB) processor 1726 and an RF circuit 1727. The BB processor 1726 may perform, for example, encoding/decoding, modulation/demodulation, and multiplexing/demultiplexing, and execute various types of signal processing in layers such as L1, Medium Access Control (MAC), Radio Link Control (RLC), and Group Data Convergence Protocol (PDCP). As an alternative of the controller 1721, the BB processor 1726 may have a part or all of the above-mentioned logical functions. The BB processor 1726 may be a memory storing a communication control program, or a module including a processor and related circuits configured to execute the program. Updating the program can change the function of the BB processor 1726. The module may be a vehicled or a blade inserted into a slot of the base station device 1720. Alternatively, the module may be a chip mounted on a vehicled or a blade. Meanwhile, the RF circuit 1727 may include, for example, a mixer, a filter, and an amplifier, and transmits and receives a wireless signal via the antenna 1710. Although FIG. 15 illustrates an example in which one RF circuit 1727 is connected to one antenna 1710, the present disclosure is not limited to this illustration, but one RF circuit 1727 may be connected to multiple antennas 1710 at the same time.

As shown in FIG. 15, the wireless communication interface 1725 may include a plurality of BB processors 1726. For example, the plurality of BB processors 1726 may be compatible with multiple frequency bands used by gNB 1700. As shown in FIG. 15, the wireless communication interface 1725 may include a plurality of RF circuits 1727. For example, the plurality of RF circuits 1727 may be compatible with multiple antenna elements. Although FIG. 15 illustrates an example in which the wireless communication interface 1725 includes a plurality of BB processors 1726 and a plurality of RF circuits 1727, the wireless communication interface 1725 may also include a single BB processor 1726 or a single RF circuit 1727.

Second Example

Figure 16:
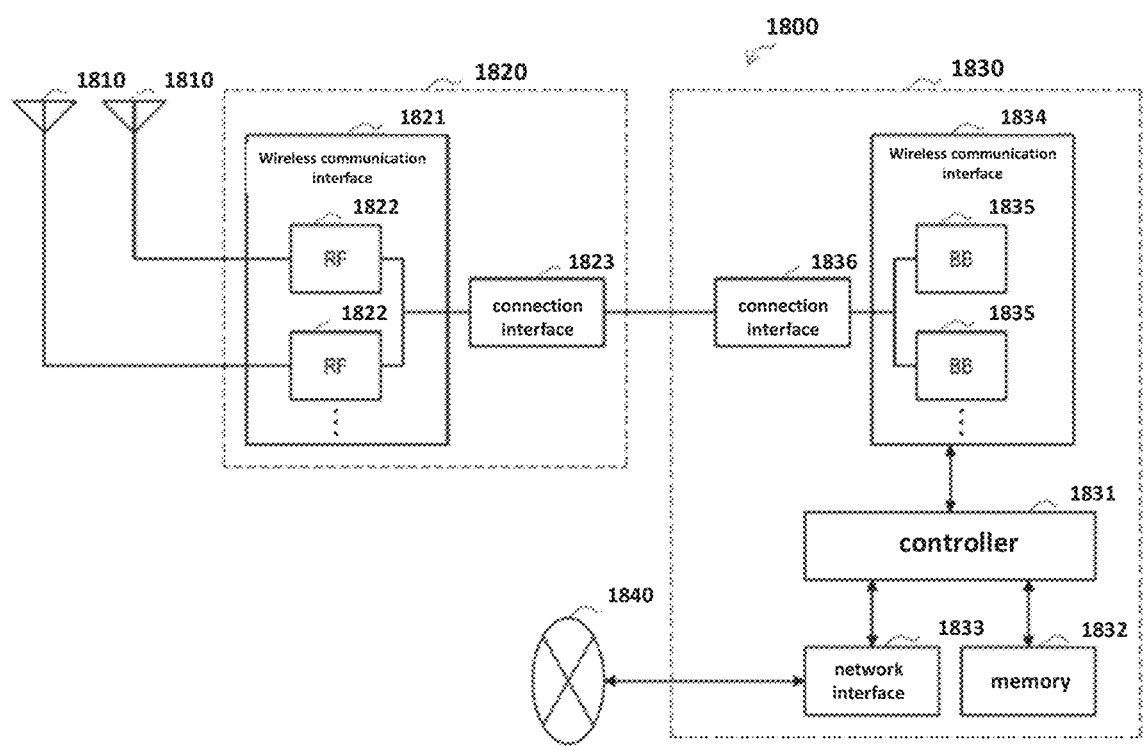
FIG. 16 is a block diagram illustrating a second example of a schematic configuration of an eNB to which the technology of the present disclosure can be applied.

FIG. 16 is a block diagram illustrating a second example of a schematic configuration of a gNB to which the technology of the present disclosure can be applied. The gNB 1800 includes multiple antennas 1810, RRH 1820 and base station equipment 1830. The RRH 1820 and each antenna 1810 may be connected to each other via an RF cable. The base station equipment 1830 and the RRH 1820 may be connected to each other via a high-speed line such as a fiber optic cable. In an implementation manner, the gNB 1800 (or the base station equipment 1830) herein may correspond to the foregoing transmitting-side and/or receiving-side electronic device.

Each of the antennas 1810 includes a single or multiple antenna elements (such as multiple antenna elements included in a MIMO antenna) and is used for RRH 1820 to transmit and receive wireless signals. As shown in FIG. 16, the gNB 1800 may include multiple antennas 1810. For example, multiple antennas 1810 may be compatible with multiple frequency bands used by gNB 1800.

The base station device 1830 includes a controller 1831, a memory 1832, a network interface 1833, a wireless communication interface 1834, and a connection interface 1836. The controller 1831, the memory 1832, and the network interface 1833 are the same as the controller 1721, the memory 1722, and the network interface 1717 described with reference to FIG. 15.

The wireless communication interface 1834 supports any cellular communication scheme such as LTE and LTE-Advanced, and provides wireless communication to a terminal located in a sector corresponding to the RRH 1820 via the RRH 1820 and the antenna 1810. The wireless communication interface 1834 may typically include, for example, a BB processor 1835. The BB processor 1835 is the same as the BB processor 1726 described with reference to FIG. 15 except that the BB processor 1835 is connected to the RF circuit 1822 of the RRH 1820 via the connection interface 1836. As shown in FIG. 16, the wireless communication interface 1834 may include a plurality of BB processors 1835. For example, multiple BB processors 1835 may be compatible with multiple frequency bands used by gNB 1800. Although FIG. 16 illustrates an example in which the wireless communication interface 1834 includes a plurality of BB processors 1835, the wireless communication interface 1834 may also include a single BB processor 1835.

The connection interface 1836 is an interface for connecting the base station device 1830 (wireless communication interface 1834) to the RRH 1820. The connection interface 1836 may also be a communication module for communication in the above-mentioned high-speed line connecting the base station device 1830 (wireless communication interface 1834) to the RRH 1820.

The RRH 1820 includes a connection interface 1823 and a wireless communication interface 1821.

The connection interface 1823 is an interface for connecting the RRH 1820 (wireless communication interface 1821)

to the base station device 1830. The connection interface 1823 may also be a communication module for communication in the above-mentioned high-speed line.

The wireless communication interface 1821 transmits and receives wireless signals via the antenna 1810. The wireless communication interface 1821 may generally include, for example, an RF circuit 1822. The RF circuit 1822 may include, for example, a mixer, a filter, and an amplifier, and transmits and receives wireless signals via the antenna 1810. Although FIG. 16 illustrates an example in which one RF circuit 1822 is connected to one antenna 1810, the present disclosure is not limited to this illustration, but one RF circuit 1822 may be connected to multiple antennas 1810 at the same time.

As shown in FIG. 16, the wireless communication interface 1821 may include a plurality of RF circuits 1822. For example, the plurality of RF circuits 1822 may support multiple antenna elements. Although FIG. 16 illustrates an example in which the wireless communication interface 1821 includes a plurality of RF circuits 1822, the wireless communication interface 1821 may include a single RF circuit 1822.

[Example of User Device/Terminal Device]

First Example

Figure 17:
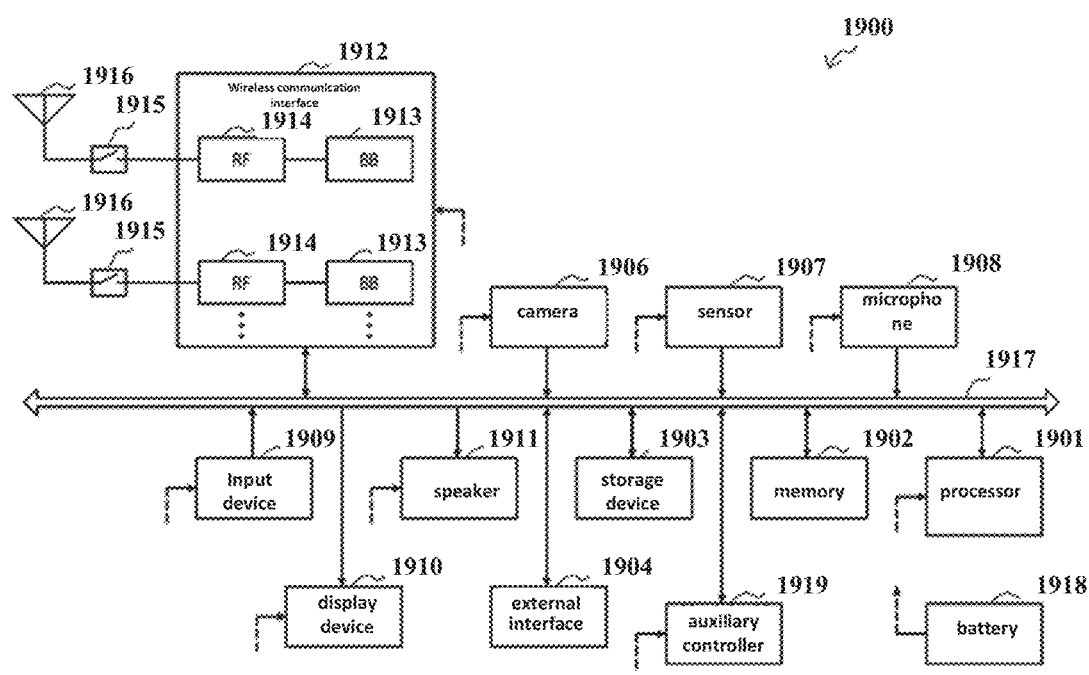
FIG. 17 is a block diagram illustrating an example of a schematic configuration of a smartphone to which the technology of the present disclosure can be applied.

FIG. 17 is a block diagram illustrating an example of a schematic configuration of a communication device 1900, such as smartphone, linker, etc., to which the technology of the present disclosure can be applied. The communication device 1900 includes a processor 1901, a memory 1902, a storage device 1903, an external connection interface 1904, a camera device 1906, a sensor 1907, a microphone 1908, an input device 1909, a display device 1910, a speaker 1911, a wireless communication interface 1912, one or more antenna switches 1915, one or more antennas 1916, a bus 1917, a battery 1918, and an auxiliary controller 1919. In an implementation manner, the communication device 1900 (or the processor 1901) herein may correspond to the foregoing transmitting device or terminal-side electronic device.

The processor 1901 may be, for example, a CPU or a system on chip (SoC), and controls functions of an application layer and another layer of the smartphone 1900. The memory 1902 includes a RAM and a ROM, and stores data and programs executed by the processor 1901. The storage device 1903 may include a storage medium such as a semiconductor memory and a hard disk. The external connection interface 1904 is an interface for connecting external devices such as a memory vehicled and a universal serial bus (USB) device to the smartphone 1900.

The camera device 1906 includes an image sensor such as a charge-coupled device (CCD) and a complementary metal oxide semiconductor (CMOS), and generates a captured image. The sensor 1907 may include a set of sensors such as a measurement sensor, a gyroscope sensor, a geomagnetic sensor, and an acceleration sensor. The microphone 1908 converts a sound input to the smartphone 1900 into an audio signal. The input device 1909 includes, for example, a touch sensor, a keypad, a keyboard, a button, or a switch configured to detect a touch on the screen of the display device 1910, and receives an operation or information input from a user. The display device 1910 includes a screen such as a liquid crystal display (LCD) and an organic light emitting diode (OLED) display, and displays an output image of the smartphone 1900. The speaker 1911 converts an audio signal output from the smartphone 1900 into a sound.

The wireless communication interface 1912 supports any cellular communication scheme such as LTE and LTE-Advanced, and performs wireless communication. The wireless communication interface 1912 may generally include, for example, a BB processor 1913 and an RF circuit 1914. The BB processor 1913 may perform, for example, encoding/decoding, modulation/demodulation, and multiplexing/demultiplexing, and perform various types of signal processing for wireless communication. Meanwhile, the RF circuit 1914 may include, for example, a mixer, a filter, and an amplifier, and transmits and receives wireless signals via the antenna 1916. The wireless communication interface 1912 may be a chip module on which a BB processor 1913 and an RF circuit 1914 are integrated. As shown in FIG. 17, the wireless communication interface 1912 may include multiple BB processors 1913 and multiple RF circuits 1914. Although FIG. 17 illustrates an example in which the wireless communication interface 1912 includes a plurality of BB processors 1913 and a plurality of RF circuits 1914, the wireless communication interface 1912 may also include a single BB processor 1913 or a single RF circuit 1914.

In addition, in addition to the cellular communication scheme, the wireless communication interface 1912 may support other types of wireless communication scheme, such as a short-range wireless communication scheme, a near field communication scheme, and a wireless local area network (LAN) scheme. In this case, the wireless communication interface 1912 may include a BB processor 1913 and an RF circuit 1914 for each wireless communication scheme.

Each of the antenna switches 1915 switches a connection destination of the antenna 1916 between a plurality of circuits included in the wireless communication interface 1912 (for example, circuits for different wireless communication schemes).

Each of the antennas 1916 includes a single or multiple antenna elements, such as multiple antenna elements included in a MIMO antenna, and is used for the wireless communication interface 1912 to transmit and receive wireless signals. As shown in FIG. 17, the smartphone 1900 may include a plurality of antennas 1916. Although FIG. 17 illustrates an example in which the smart phone 1900 includes a plurality of antennas 1916, the smart phone 1900 may also include a single antenna 1916.

In addition, the smartphone 1900 may include an antenna 1916 for each wireless communication scheme. In this case, the antenna switch 1915 may be omitted from the configuration of the smartphone 1900.

The bus 1917 connects the processor 1901, the memory 1902, the storage device 1903, the external connection interface 1904, the camera device 1906, the sensor 1907, the microphone 1908, the input device 1909, the display device 1910, the speaker 1911, the wireless communication interface 1912, and the auxiliary controller 1919 to each other. The battery 1918 supplies power to each block of the smartphone 1900 shown in FIG. 17 via a feeder, and the feeder is partially shown as a dotted line in the figure. The auxiliary controller 1919 operates the minimum necessary functions of the smartphone 1900 in the sleep mode, for example.

Second Example

Figure 18:
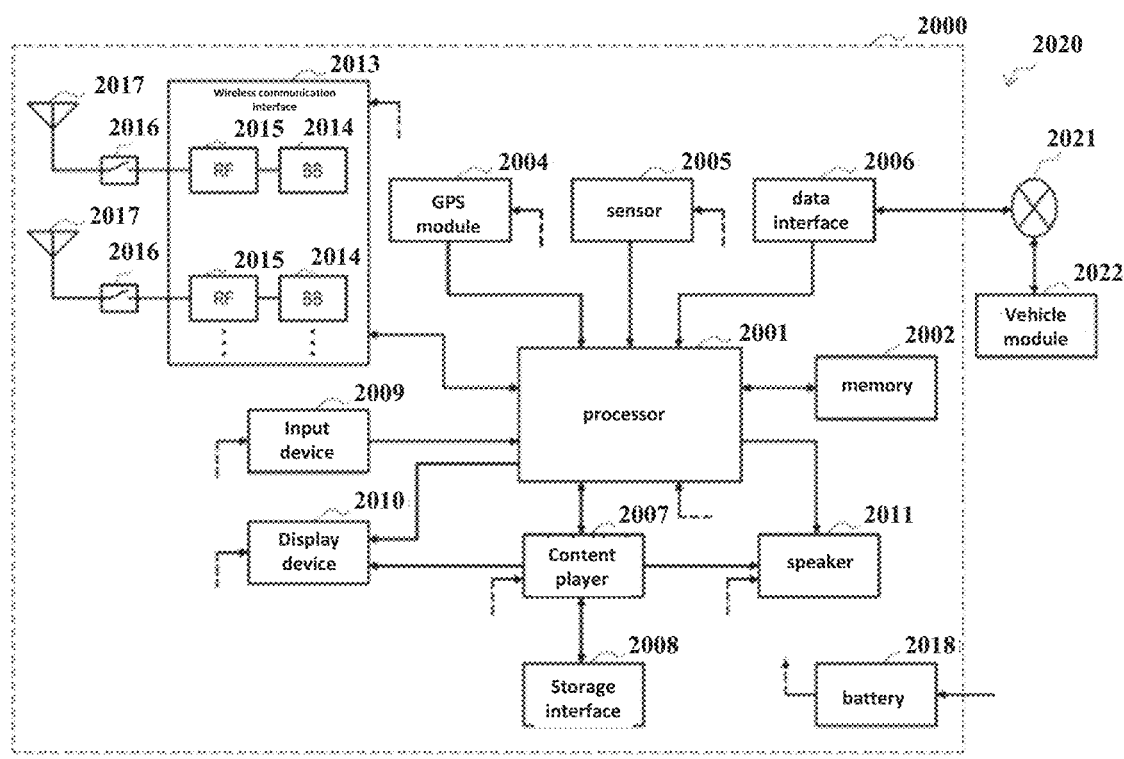
FIG. 18 is a block diagram illustrating an example of a schematic configuration of a vehicle navigation device to which the technology of the present disclosure can be applied.

FIG. 18 is a block diagram illustrating an example of a schematic configuration of a vehicle navigation device 2000 to which the technology of the present disclosure can be applied. The vehicle navigation device 2000 includes a processor 2001, a memory 2002, a global location system (GPS) module 2004, a sensor 2005, a data interface 2006, a content player 2007, a storage medium interface 2008, an input device 2009, a display device 2010, a speaker 2011, and a wireless communication interface 2013, one or more antenna switches 2016, one or more antennas 2017, and a battery 2018. In an implementation manner, the vehicle navigation device 2000 (or the processor 2001) herein may correspond to the transmitting device or terminal-side electronic device.

The processor 2001 may be, for example, a CPU or a SoC, and controls navigation functions and other functions of the vehicle navigation device 2000. The memory 2002 includes a RAM and a ROM, and stores data and programs executed by the processor 2001.

The GPS module 2004 uses a GPS signal received from a GPS satellite to measure the position (such as latitude, longitude, and altitude) of the vehicle navigation device 2000. The sensor 2005 may include a set of sensors such as a gyroscope sensor, a geomagnetic sensor, and an air pressure sensor. The data interface 2006 is connected to, for example, an in-vehicle network 2021 via a terminal not shown, and acquires data (such as vehicle speed data) generated by the vehicle.

The content player 2007 reproduces content stored in a storage medium such as a CD and a DVD, which is inserted into the storage medium interface 2008. The input device 2009 includes, for example, a touch sensor, a button, or a switch configured to detect a touch on the screen of the display device 2010, and receives an operation or information input from a user. The display device 2010 includes a screen such as an LCD or OLED display, and displays an image of a navigation function or reproduced content. The speaker 2011 outputs the sound of the navigation function or the reproduced content.

The wireless communication interface 2013 supports any cellular communication scheme such as LTE and LTE-Advanced, and performs wireless communication. The wireless communication interface 2013 may generally include, for example, a BB processor 2014 and an RF circuit 2015. The BB processor 2014 may perform, for example, encoding/decoding, modulation/demodulation, and multiplexing/demultiplexing, and perform various types of signal processing for wireless communication. Meanwhile, the RF circuit 2015 may include, for example, a mixer, a filter, and an amplifier, and transmit and receive wireless signals via the antenna 2017. The wireless communication interface 2013 may also be a chip module on which a BB processor 2014 and an RF circuit 2015 are integrated. As shown in FIG. 18, the wireless communication interface 2013 may include a plurality of BB processors 2014 and a plurality of RF circuits 2015. Although FIG. 18 illustrates an example in which the wireless communication interface 2013 includes a plurality of BB processors 2014 and a plurality of RF circuits 2015, the wireless communication interface 2013 may also include a single BB processor 2014 or a single RF circuit 2015.

In addition, in addition to the cellular communication scheme, the wireless communication interface 2013 may support other types of wireless communication scheme, such as a short-range wireless communication scheme, a near field communication scheme, and a wireless LAN scheme. In this case, the wireless communication interface 2013 may include a BB processor 2014 and an RF circuit 2015 for each wireless communication scheme.

Each of the antenna switches 2016 switches the connection destination of the antenna 2017 between a plurality of circuits included in the wireless communication interface 2013, such as circuits for different wireless communication schemes.

Each of the antennas 2017 includes a single or multiple antenna element, such as multiple antenna elements included in a MIMO antenna, and is used for the wireless communication interface 2013 to transmit and receive wireless signals. As shown in FIG. 18, the vehicle navigation device 2000 may include a plurality of antennas 2017. Although FIG. 18 illustrates an example in which the vehicle navigation device 2000 includes a plurality of antennas 2017, the vehicle navigation device 2000 may also include a single antenna 2017.

In addition, the vehicle navigation device 2000 may include an antenna 2017 for each wireless communication scheme. In this case, the antenna switch 2016 may be omitted from the configuration of the vehicle navigation device 2000.

The battery 2018 supplies power to each block of the vehicle navigation device 2000 shown in FIG. 18 via a feeder, and the feeder is partially shown as a dotted line in the figure. The battery 2018 accumulates power provided from the vehicle.

The technology of the present disclosure may also be implemented as a vehicle on-board system (or vehicle) 2020 including one or more of a vehicle navigation device 2000, an in-vehicle network 2021, and a vehicle module 2022. The vehicle module 2022 generates vehicle data such as vehicle speed, engine speed, and failure information, and outputs the generated data to the in-vehicle network 2021.

The exemplary embodiments of the present disclosure have been described with reference to the drawings, but the present disclosure is of course not limited to the above examples. Those skilled in the art may find various alternations and modifications within the scope of the appended claims, and it should be understood that they will naturally fall in the technical scope of the present disclosure.

It should be noted that the methods and devices described herein can be implemented as software, firmware, hardware or any combination thereof. Some components can be implemented as software running on a digital signal processor or microprocessor, for example. Other components can be implemented as hardware and/or application specific integrated circuits, for example.

In the case of implementation by software and/or firmware, corresponding programs constituting the corresponding software are stored in the storage medium of the related device, and the programs, when executed, can perform various functions. For example, a plurality of functions included in one unit in the above embodiment can be realized by separate devices. Alternatively, a plurality of functions included in one unit in the above embodiments may be respectively realized by separate devices. In addition, one of the above functions can be realized by multiple units, and such a configuration is also included in the technical scope of this disclosure.

The above-described sequence of steps of the method is only illustrative, and the steps of the method of the present invention are not limited to the above-described sequence unless otherwise specifically stated. In this specification, the steps described in the flowchart include not only the processes that are executed in time series in the stated order, but also the processes that are executed in parallel or solely instead of necessarily in time series. In addition, even in the step of processing in time series, needless to say, the order can be appropriately changed.

Furthermore, in some embodiments, the present disclosure can also be embodied as a program recorded in a recording medium, including machine-readable instructions for implementing the method according to the present disclosure.

Therefore, machine-readable storage media and program products for carrying or including the above machine-readable instructions also fall within the scope of this disclosure. It should be understood that the machine-readable instructions in the machine-readable storage medium or program products according to embodiments of the present disclosure can be configured to perform the operations corresponding to the above-described device and method embodiments. When referring to the above-mentioned device and method embodiments, the embodiments of machine-readable storage media or program products are clear to those skilled in the art, so their description will not be repeated. Such storage media may include, but are not limited to, floppy disks, optical disks, magneto-optical disks, memory cards, memory sticks, etc.

Those skilled in the art should realize that the boundaries between the above operations are only illustrative. Multiple operations can be combined into a single operation, which can be distributed among additional operations, and the operations can be performed at least partially overlapping in time. Furthermore, alternative embodiments may include multiple instances of specific operations, and the order of operations may be changed in other various embodiments. However, other modifications, changes and substitutions are also possible. Therefore, the description and drawings should be regarded as illustrative rather than restrictive.

In addition, embodiments of the present disclosure may also include the following exemplary examples (EE).

EE1. A receiving-side electronic device for a receiving side of a communication system, the receiving-side electronic device being capable of communicating with more than one transmitting-side electronic devices for a transmitting side of the communication system, the receiving-side electronic device comprising a processing circuit configured to: receive initial transmission information from a first electronic device among the more than one transmitting-side electronic devices; in case that data information in the initial transmission information cannot be successfully decoded, acquire auxiliary information, which is able to be used to determine resources used by the first electronic device for information retransmission with the receiving-side electronic device; and feed back the auxiliary information to the first electronic device, so that the first electronic device is able to perform the information retransmission by using the resources determined based on the auxiliary information.

EE 2. The electronic device of EE 1, wherein the auxiliary information is based on resource information indicating other resources used by other electronic devices in the more than one transmitting-side electronic devices for communication transmission with the receiving-side electronic device.

EE 3. The electronic device of EE 1, wherein the auxiliary information includes information indicating whether reserved resources of the first electronic device for information retransmission are available or not, and whether the reserved resources of the first electronic device for information retransmission are available or not is judged by comparing the reserved resources with other resources used by other electronic devices in the more than one transmitting-side electronic devices for communication transmission with the receiving-side electronic device.

EE 4. The electronic device of EE 3, wherein the auxiliary information includes binary data indicating whether the reserved resources of the first electronic device are available or not, and the amount of the binary data is the same as that of the reserved resources, and each binary data indicates whether a corresponding reserved resource is available or not.

EE 5. The electronic device of EE 2 or 3, wherein the other resources are obtained by the receiving-side electronic device performing communication resource sensing.

EE 6. The electronic device of EE 5, wherein the resource sensing includes communication reference signal power measurement between the receiving-side electronic device and the other transmitting-side electronic devices in the more than one transmitting-side electronic devices, and resources corresponding to signal powers higher than a first specific threshold are obtained as the other resources.

EE 7. The electronic device of EE 2 or 3, wherein the initial transmission information from the transmitting-side electronic device further includes information indicating current resources used by the transmitting-side electronic device for current transmission and reserved resources used by the transmitting-side electronic device for information retransmission, and wherein the other resources are obtained by the receiving-side electronic device decoding information indicating resources in the initial transmission information from other transmitting-side electronic devices in the more than one transmitting-side electronic devices.

EE 8. A transmitting-side electronic device for a transmitting side of a communication system, the transmitting-side electronic device being capable of communicating with at least one receiving-side electronic device for a receiving side of the communication system, the transmitting-side electronic device comprising a processing circuit configured to, for each of the at least one receiving-side electronic device, send initial transmission information to the receiving-side electronic device, receive auxiliary information from the receiving-side electronic device, wherein the auxiliary information is able to be used to determine resources used by the transmitting-side electronic device for information retransmission with the receiving-side electronic device, and perform information retransmission by utilizing the resources determined based on the auxiliary information.

EE 9. The electronic device of EE 8, wherein the resources for information retransmission are determined by the transmitting-side electronic device, or the transmitting-side electronic device transmits the auxiliary information to other devices in the communication system, whereby the other devices determine the resources for information retransmission based on the auxiliary information and notifies the transmitting-side electronic device of the determined resources.

EE 10. The electronic device of EE 8, wherein when it is judged that reserved resources of the transmitting-side electronic device for information retransmission are available based on the auxiliary information, the available reserved resources are used for information retransmission.

EE 11. The electronic device of EE 8, wherein when it is judged that none of the reserved resources of the transmitting-side electronic device for information retransmission is available based on the auxiliary information, newly determined resources are used for information retransmission.

EE 12. The electronic device of EE 8, wherein the resources used for the communication between the transmitting-side electronic device and the receiving-side electronic device are determined by the transmitting-side electronic device performing resource sensing, or by other devices in the communication system performing source sensing.

EE 13. The electronic device of EE 12, wherein the resource sensing includes communication reference signal power measurement, and resources corresponding to signal powers lower than a second specific threshold are obtained as available communication resources.

EE 14. The electronic device of EE 8, wherein the auxiliary information is based on resource information about other resources used by other transmitting-side electronic devices in the communication system for communication transmission with the receiving-side electronic device, and whether reserved resources of the transmitting-side electronic device for information retransmission are available for information retransmission or not is judged by comparing the reserved resources with resources indicated by the resource information.

EE 15. The electronic device of EE 8, wherein the auxiliary information includes information indicating whether reserved resources of the transmitting-side electronic device for information retransmission are available or not, and whether the reserved resources of the transmitting-side electronic device for information retransmission are available or not is judged by comparing the reserved resources with other resources used by other transmitting-side electronic devices in the communication system for communication transmission with the receiving-side electronic device.

EE 16. The electronic device of EE 15, wherein the auxiliary information includes binary data indicating whether the reserved resources of the transmitting-side electronic device are available or not, and the amount of the binary data is the same as that of the reserved resources, and each binary data indicates whether a corresponding reserved resource is available or not.

EE 17. The electronic device of EE 14 or 15, wherein the other resources are obtained by the receiving-side electronic device performing communication resource sensing.

EE 18. The electronic device of EE 17, wherein the resource sensing includes communication reference signal power measurement between the receiving-side electronic device and the other transmitting-side electronic devices, and resources corresponding to signal powers higher than a first specific threshold are obtained as the other resources.

EE 19. The electronic device of EE 14 or 15, wherein the initial transmission information from the transmitting-side electronic device further includes information indicating current resources used by the transmitting-side electronic device for current transmission and reserved resources used by the transmitting-side electronic device for information retransmission, and wherein the other resources are obtained by the receiving-side electronic device decoding information indicating resources in the initial transmission information from other transmitting-side electronic devices.

EE 20. The electronic device of EE 8, wherein the transmitting-side electronic device notifies information about whether it is able to receive the auxiliary information or not to the receiving-side electronic device.

EE 21. A method for a receiving side of a wireless communication system, comprising: receiving initial transmission information from a first electronic device among the more than one transmitting-side electronic devices for a transmitting side of the communication system, in case that data information in the initial transmission information cannot be successfully decoded, acquiring auxiliary information, which is able to be used to determine resources used by the first electronic device for information retransmission with the receiving-side electronic device, and feeding back the auxiliary information to the first electronic device, so that the first electronic device is able to perform the information retransmission by using the resources determined based on the auxiliary information.

EE 22. A method for a transmitting side of a wireless communication system, the method comprising, for each of at least one receiving-side electronic device for a receiving side of the wireless communication system: sending initial transmission information to the receiving-side electronic device, receiving auxiliary information from the receiving-side electronic device, wherein the auxiliary information is able to be used to determine resources used by the transmitting-side electronic device for information retransmission with the receiving-side electronic device, and performing information retransmission by utilizing the resources determined based on the auxiliary information.

EE 23. A device comprising
at least one processor; and
at least one storage device that stores instructions thereon that, when executed by the at least one processor, cause the at least one processor to execute the method of any one of EE 21 or 22.

EE 24. A storage medium storing instructions which, when executed by a processor, cause execution of the method of any one of EE 21 or 22.

EE 25. An apparatus comprising means for performing the method of any one of EE 21 or 22.

Although the present disclosure and its advantages have been described in detail, it should be understood that various changes, substitutions and alterations can be made hereto without departing from the spirit and scope of the present disclosure as defined by the appended claims. Furthermore, the terms "including", "comprising", or any other variation thereof, of the embodiments of the present disclosure are intended to encompass non-exclusive inclusion, such that a process, method, article, or device that includes a series of elements includes not only those elements, but also includes other elements not explicitly listed, or those inherent in the process, method, article, or equipment. Without more restrictions, the elements defined by the sentence "including a . . . " do not exclude the existence of other identical elements in the process, method, article, or equipment including the elements.

Although some specific embodiments of the present disclosure have been described in detail, those skilled in the art should understand that the above-described embodiments are merely illustrative and do not limit the scope of the present disclosure. Those skilled in the art should understand that the above-described embodiments may be combined, modified, or replaced without departing from the scope and essence of the present disclosure. The scope of the present disclosure is defined by the appended claims.

What is claimed is:

1. A receiving-side electronic device for a receiving side of a communication system, the receiving-side electronic device being capable of communicating with plural transmitting-side electronic devices of a transmitting side of the communication system, the receiving-side electronic device comprising a processing circuit configured to:
receive an initial transmission of data and other information from a first electronic device among the more than one transmitting-side electronic devices, wherein the other information includes:
information indicating current resources used by the first electronic device for the initial transmission of the data, and
binary data indicating first reserved resources that are available for use for the retransmission of the data and second reserved resources that are not available for use for the retransmission of the data by the first electronic device, the first and second reserved resources being the resources assigned to other transmitting-side electronic devices of the plural transmitting-side electronic devices,
perform decoding on the data information in the initial transmission, and
based on data information in the initial transmission of the data not being successfully decoded the receiving-side electronic device:
decode the other information,
perform sensing on the first reserved resources to compare a corresponding energy level to a predetermined threshold so as to identify at least one resource of the first reserved resources that is not currently being used,
send auxiliary information as feedback to the first electronic device, the auxiliary information identifying the at least one resource of the first reserved resources that is not currently being used, and
based on the auxiliary information, receive the retransmission of the data via the at least one resource of the reserved resources that is not currently being used.

2. A method performed by a receiving side of a wireless communication system, the method comprising:
receiving an initial transmission information of data and other from a first electronic device among plural transmitting-side electronic devices of a transmitting side of the communication system;
wherein the other information includes:
information indicating current resources used by the first electronic device for the initial transmission of the data, and
binary data indicating first reserved resources that are available for use for the retransmission of the data and second reserved resources that are not available for use for the retransmission of the data by the first electronic device, the first and second reserved resources being the resources assigned to other transmitting-side electronic devices of the plural transmitting-side electronic devices;
performing decoding on the data information in the initial transmission; and
based on data information in the initial transmission of the data not being successfully decoded the receiving-side electronic device:
decoding the other information;
performing sensing on the first reserved resources to compare a corresponding energy level to a predetermined threshold so as to identify at least one resource of the first reserved resources that is not currently being used;
sending auxiliary information as feedback to the first electronic device, the auxiliary information identifying the at least one resource of the first reserved resources that is not currently being used; and
based on the auxiliary information, receiving the retransmission of the data via the at least one resource of the reserved resources that is not currently being used.

3. A non-transitory computer product containing instructions for a method performed by a receiving side of a wireless communication system, the method comprising:
receiving an initial transmission information of data and other from a first electronic device among plural transmitting-side electronic devices of a transmitting side of the communication system;
wherein the other information includes:
information indicating current resources used by the first electronic device for the initial transmission of the data, and
binary data indicating first reserved resources that are available for use for the retransmission of the data and second reserved resources that are not available for use for the retransmission of the data by the first electronic device, the first and second reserved resources being the resources assigned to other transmitting-side electronic devices of the plural transmitting-side electronic devices;
performing decoding on the data information in the initial transmission; and
based on data information in the initial transmission of the data not being successfully decoded the receiving-side electronic device:
decoding the other information;
performing sensing on the first reserved resources to compare a corresponding energy level to a predetermined threshold so as to identify at least one resource of the first reserved resources that is not currently being used;
sending auxiliary information as feedback to the first electronic device, the auxiliary information identifying the at least one resource of the first reserved resources that is not currently being used; and
based on the auxiliary information, receiving the retransmission of the data via the at least one resource of the reserved resources that is not currently being used.

* * * * *